US009311752B2

(12) United States Patent
Chosokabe et al.

(10) Patent No.: US 9,311,752 B2
(45) Date of Patent: Apr. 12, 2016

(54) IMAGE DISPLAYING METHOD FOR A HEAD-MOUNTED TYPE DISPLAY UNIT

(71) Applicant: Sony Corporation, Tokyo (JP)

(72) Inventors: Yoshihiro Chosokabe, Nagano (JP); Ikuo Matsumura, Tokyo (JP)

(73) Assignee: Sony Corporation, Tokyo (JP)

( * ) Notice: Subject to any disclaimer, the term of this patent is extended or adjusted under 35 U.S.C. 154(b) by 295 days.

(21) Appl. No.: 14/031,740

(22) Filed: Sep. 19, 2013

(65) Prior Publication Data

US 2014/0022284 A1      Jan. 23, 2014

Related U.S. Application Data

(63) Continuation of application No. 13/078,153, filed on Apr. 1, 2011, now Pat. No. 8,570,242.

(30) Foreign Application Priority Data

Apr. 8, 2010  (JP) ................................. 2010-089495

(51) Int. Cl.
| | |
|---|---|
| G06T 19/00 | (2011.01) |
| G02B 27/01 | (2006.01) |
| G06F 3/01 | (2006.01) |
| G02B 6/00 | (2006.01) |

(52) U.S. Cl.
CPC ............ *G06T 19/006* (2013.01); *G02B 27/017* (2013.01); *G06F 3/011* (2013.01); *G02B 6/00* (2013.01); *G02B 2027/014* (2013.01); *G02B 2027/0178* (2013.01)

(58) Field of Classification Search
CPC .. G02B 27/017; G02B 6/00; G02B 2027/014; G02B 2027/0178; G06F 3/011; G06T 19/006
See application file for complete search history.

(56) References Cited

U.S. PATENT DOCUMENTS

| | | | |
|---|---|---|---|
| 6,349,001 B1 | 2/2002 | Spitzer | |
| 7,525,556 B2 | 4/2009 | Ishiai | |
| 8,570,242 B2 * | 10/2013 | Chosokabe | .......... G02B 27/017 345/7 |
| 2007/0070504 A1 | 3/2007 | Akutsu et al. | |

(Continued)

FOREIGN PATENT DOCUMENTS

| | | |
|---|---|---|
| JP | 09-127459 A | 5/1997 |
| JP | 11-202256 A | 7/1999 |
| JP | 2002-018158 A | 1/2002 |

(Continued)

*Primary Examiner* — Abbas Abdulselam
(74) *Attorney, Agent, or Firm* — Wolf, Greenfield & Sacks, P.C.

(57) ABSTRACT

Disclosed herein is an image displaying method for a head-mounted type display unit which includes a frame of the glasses type for being mounted on the head of an observer, an image display apparatus attached to the frame, and a control section for controlling image display of the image display apparatus. The image display apparatus includes an image forming apparatus, and an optical apparatus. The image displaying method includes the steps of: storing a data group configured from a plurality of data in a storage section; adding a data identification code to each of the data; sending a designation identification code and display time information at predetermined intervals of time; and reading out the data whose data identification code coincides with the received designation identification code from the storage section and controlling the image forming apparatus to display an image based on the read out data.

20 Claims, 22 Drawing Sheets

(56) References Cited

U.S. PATENT DOCUMENTS

| | | |
|---|---|---|
| 2007/0070859 A1 | 3/2007 | Hirayama |
| 2011/0248905 A1 | 10/2011 | Chosokabe et al. |

FOREIGN PATENT DOCUMENTS

| | | |
|---|---|---|
| JP | 2004-054890 A | 2/2004 |
| JP | 2004-219472 A | 8/2004 |
| JP | 2004-309577 A | 11/2004 |
| JP | 2004-333689 A | 11/2004 |
| JP | 2006-059136 A | 3/2006 |
| JP | 2006-119297 A | 5/2006 |
| JP | 2006-162767 A | 6/2006 |
| JP | 2006-309314 A | 11/2006 |
| JP | 2007-086716 A | 4/2007 |
| JP | 2007-094175 A | 4/2007 |
| JP | 2007-155827 A | 6/2007 |
| JP | 2008-067218 A | 3/2008 |
| JP | 2008-083290 A | 4/2008 |
| JP | 2009-092810 A | 4/2009 |
| JP | 2009-211447 A | 9/2009 |
| JP | 2009-271732 A | 11/2009 |
| JP | 2010-048998 A | 3/2010 |
| JP | 2010-079121 A | 4/2010 |
| JP | 2010-237522 A | 10/2010 |
| JP | 2011-053468 A | 3/2011 |
| JP | 2011-085830 A | 4/2011 |

* cited by examiner

F I G . 4
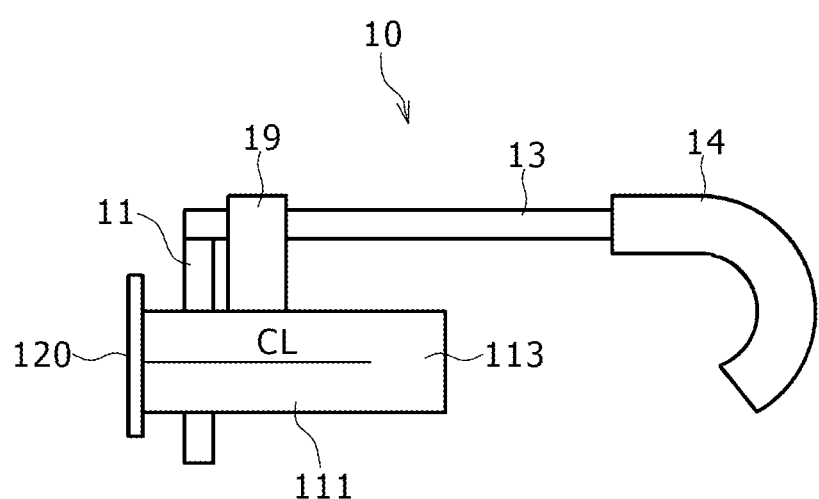

F I G . 6
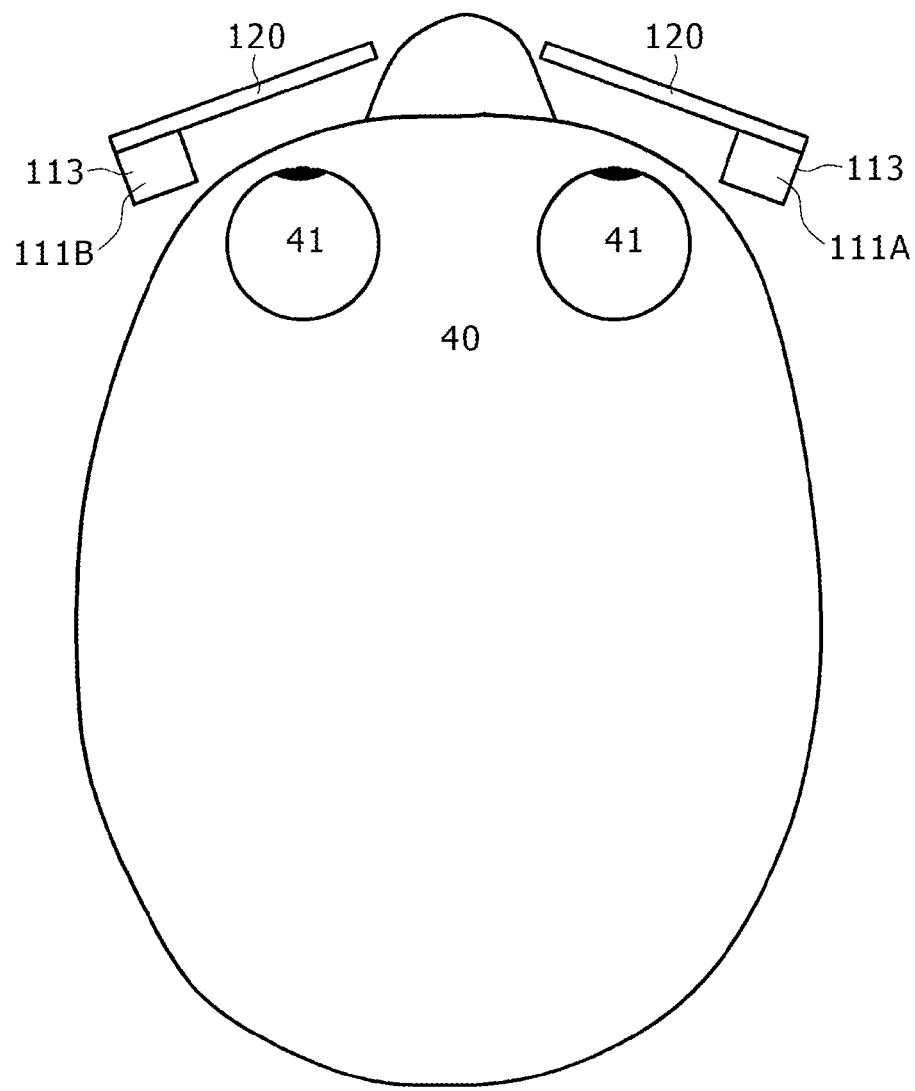

| DESIGNATION IDENTIFICATION CODE | TOTAL DISPLAY TIME | LUMINANCE INFORMATION | DATA |
|---|---|---|---|
| 01 | 10 | 60 | AAAAAAAAAA |
| 02 | 20 | 60 | BBBBBBBBBB |
| 03 | 15 | 80 | CCCCCCCCCC |
| 04 | 20 | 50 | DDDDDDDDD |
|  |  |  |  |

DISPLAY REGION OF DESIGNATION IDENTIFICATION CODE, etc.

DISPLAY OF DISPLAY DATA

DISPLAY NUMBER OF HEAD-MOUNTED TYPE DISPLAY UNITS

BAR DISPLAY OF REMAINING TIME OF DISPLAY TIME INFORMATION

IMAGE DISPLAYING METHOD FOR A HEAD-MOUNTED TYPE DISPLAY UNIT

CROSS-REFERENCES TO RELATED APPLICATIONS

The present application claims the benefit as a continuation under 35 U.S.C. §120 of U.S. patent application Ser. No. 13/078,153, titled "IMAGE DISPLAYING METHOD FOR A HEAD-MOUNTED TYPE DISPLAY UNIT," filed on Apr. 1, 2011, which claims the benefit under 35 U.S.C. §119 of Japanese Patent Application JP2010-089495, filed on Apr. 8, 2010. Each of these applications is hereby incorporated by reference in its entirety.

BACKGROUND OF THE INVENTION

1. Field of the Invention

This invention relates to an image displaying method for a head-mounted type display unit (HMD: Head Mounted Display).

2. Description of the Related Art

A virtual image display apparatus for allowing an observer to observe a two-dimensional image formed by an image forming apparatus as an enlarged virtual image by means of a virtual image optical system is known and disclosed, for example, in Japanese Patent Laid-Open No. 2006-162767 (referred to as Patent Document 1 hereinafter).

FIG. 1 schematically shows the image display apparatus mentioned above. Referring to FIG. 1, the image display apparatus 100 shown includes an image forming apparatus 111 including a plurality of pixels arrayed in a two-dimensional matrix, a collimate optical system 112 for converting light outputted from the pixels of the image forming apparatus 111 into parallel light, and an optical apparatus or a light guide section 120 to which the parallel light from the collimate optical system 112 is inputted and by and from which the parallel light is guided and outputted. The optical apparatus 120 includes a light guide plate 121 in which light inputted thereto propagates by total reflection until it is outputted therefrom, and first deflection section 130 formed, for example, from a light reflecting film of one layer for reflecting the light inputted to the light guide plate 121 so that the light inputted to the light guide plate 121 may be totally reflected in the inside of the 121 light guide plate 121. The optical apparatus 120 further includes a second deflection section 140 formed, for example, from a light reflecting multilayer film having a multilayer lamination structure for emitting the light propagated in the inside of the light guide plate 121 by total reflection from the light guide plate 121. Such an image display apparatus 100 as just described can achieve, if it is used to configure a head-mounted display unit, reduction in weight and size of the apparatus.

Another virtual image display apparatus which uses a hologram diffraction grating in order to allow an observer to observe a two-dimensional image formed by an image forming apparatus as an enlarged virtual image by means of a virtual image optical system is known and disclosed, for example, in Japanese Patent Laid-Open No. 2007-94175 (referred to as Patent Document 2 hereinafter).

FIGS. 15A and 15B schematically shows a concept of the image display apparatus mentioned above. Referring to FIGS. 15A and 15B, the image display apparatus 300 shown basically includes an image forming apparatus 111 for displaying an image, a collimate optical system 112, and an optical apparatus or a light guide section 320 for receiving the light displayed on the image forming apparatus 111 and guiding the light to the pupil 41 of an observer. The optical apparatus 320 includes a light guide plate 321, and a first diffraction grating member 330 and a second diffraction grating member 340 provided on the light guide plate 321 and each formed from a reflection type volume hologram diffraction grating. Light emitted from pixels of the image forming apparatus 111 is inputted to the collimate optical system 112, and parallel light is produced by the collimate optical system 112 and inputted to the light guide plate 321. The parallel light is inputted to a first face 322 of the light guide plate 321 and outputted from the first face 322. Meanwhile, the first diffraction grating member 330 and the second diffraction grating member 340 are attached to a second face 323 of the light guide plate 321 which extends in parallel to the first face 322 of the light guide plate 321.

Meanwhile, a subtitle display apparatus for the subtitle display for which a head-mounted type display unit is used and which is mounted immediately in front of a spectator by a mounting section to assist watching of a theatrical performance is known and disclosed, for example, in Japanese Patent Laid-Open No. 2002-018158 (referred to as Patent Document 3 hereinafter). The subtitle display apparatus disclosed in the document mentioned includes an information outputting section for producing and storing original information for the subtitle display and outputting the original information as subtitle information, and a signal transmission section for transmitting the subtitle information in a superimposed relationship on a signal transmission medium. The subtitle display apparatus further includes a signal reception section for extracting the subtitle information from the signal transmission medium and outputting the subtitle information, and a subtitle display section disposed immediately in front of a spectator for displaying subtitles based on the subtitle information.

SUMMARY OF THE INVENTION

Incidentally, Patent Document 3 discloses nothing of a process to be carried out when the signal reception section fails, by some reason, in reception of subtitle information transmitted from the signal transmission section. If such a problem occurs particularly in the case where subtitle information transmitted from a single signal transmission section is received by a plurality of signal reception sections, then the plural subtitle display sections are disabled from simultaneously displaying the subtitles, and in the first place, the subtitles cannot be displayed by the subtitle display section. Further, in the case where the spectator is a foreigner, although it is preferable for subtitle display to be given in a language used by the spectator, Patent Document 3 discloses nothing of a countermeasure for the requirement. Furthermore, depending upon the position of the seat on which the spectator is seated, some imbalance sometimes occurs between the size in which a character in a theatrical performance or the like who is an object of appreciation in watching of the theatrical performance and the size of characters of the subtitles. Further, depending upon the position of the seat, an optimum angle of convergence exists. However, Patent Document 3 is silent of the matters described.

Therefore, it is desirable to provide an image displaying method for a head-mounted type display unit which can display an image with certainty even if a reception apparatus fails in reception of data transmitted from a transmission apparatus.

Also it is desirable to provide an image displaying method for a head-mounted type display unit with which imbalance between the size with which an observation object is visually observed and the size of an image to be displayed is less likely to occur.

Further, it is desirable to provide an image displaying method for a head-mounted type display unit which can display an image using a language used by a spectator.

Furthermore, it is desirable to provide an image displaying method for a head-mounted type display unit with which the angle of convergence can be set to an optimum angle of convergence depending upon the distance between an observer and an observation object.

According to an embodiment of the present invention, there is provided an image displaying method for a head-mounted type display unit which includes (a) a frame of the glasses type for being mounted on the head of an observer, (b) an image display apparatus attached to the frame, and (c) control means for controlling image display of the image display apparatus, and the image display apparatus including (A) an image forming apparatus, and (B) an optical apparatus to which light outputted from the image forming apparatus is inputted and by and from which the light is guided and outputted, the image displaying method comprising the steps of:

storing a data group configured from a plurality of data in storage means provided in the control means;

adding a data identification code to each of the data which configure the data group;

sending a designation identification code and display time information at predetermined intervals of time from the outside to the control means; and reading out, in the control means, the data whose data identification code coincides with the received designation identification code from the storage means and controlling the image forming apparatus to display an image based on the read out data for a period of time corresponding to the received display time information.

According to another embodiment of the present invention, there is provided an image displaying method for a head-mounted type display unit which includes (a) a frame of the glasses type for being mounted on the head of an observer, (b) an image display apparatus attached to the frame, and (c) control means for controlling image display of the image display apparatus, and the image display apparatus including (A) an image forming apparatus, and (B) an optical apparatus to which light outputted from the image forming apparatus is inputted and by and from which the light is guided and outputted, the image displaying method having the steps of:

storing a data group configured from a plurality of data in storage means provided in the control means;

adding a data identification code to each of the data which configure the data group;

configuring each of the data from a plurality of different size display data for different display sizes;

sending a designation identification code from the outside to the control means; and reading out, in the control means, one of the plural different size display data of the data whose data identification code coincides with the received designation identification code in response to the distance between the observation object and the head-mounted type display unit from the storage means, and controlling the image forming apparatus to display an image based on this one different size display data.

According to further embodiment of the present invention, there is provided an image displaying method for a head-mounted type display unit which includes (a) a frame of the glasses type for being mounted on the head of an observer, (b) an image display apparatus attached to the frame, and (c) control means for controlling image display of the image display apparatus, and the image display apparatus including (A) an image forming apparatus, and (B) an optical apparatus to which light outputted from the image forming apparatus is inputted and by and from which the light is guided and outputted, the image displaying method having the steps of:

storing a data group configured from a plurality of data in storage means provided in the control means;

adding a data identification code to each of the data which configure the data group;

configuring each of the data from a plurality of different language display data for different display languages;

sending a designation identification code from the outside to the control means; and reading out, in the control means, one of the plural different language display data of the data whose data identification code coincides with the received designation identification code from the storage means, and controlling the image forming apparatus to display an image based on this one different language display data.

According to still further embodiment of the present invention, there is provided an image displaying method for a head-mounted type display unit which includes (a) a frame of the glasses type for being mounted on the head of an observer, (b) two image display apparatus for the right eye and the left eye attached to the frame, and (c) control means for controlling image display of the image display apparatus, and the image display apparatus including (A) an image forming apparatus, and (B) an optical apparatus to which light outputted from the image forming apparatus is inputted and by and from which the light is guided and outputted, the image displaying method having the steps of:

storing a data group configured from a plurality of data in storage means provided in the control means;

adding a data identification code to each of the data which configure the data group;

sending a designation identification code from the outside to the control means; and reading out, in the control means, the data whose data identification code coincides with the received designation identification code, and carrying out data processing in response to the distance between the observation object and the head-mounted type display unit to display images based on the data on the image forming apparatus in a state in which an angle of convergence between the images is controlled.

According to an embodiment of the present invention, there is provided a head-mounted type display unit, including:

an image display apparatus; and control means for controlling image display of the image display apparatus;

the control means including storage means in which a data group configured from a plurality of data is stored;

a data identification code being added to each of the data which configure the data group;

a designation identification code and display time information being sent at predetermined intervals of time from the outside to the control means;

the control means reading out the data whose data identification code coincides with the received designation identification code from the storage means and causing an image based on the read out data to be displayed for a period of time corresponding to the display time information sent thereto.

In the image displaying method according to the first embodiment of the present invention, a designation identification code and display time information are sent at the predetermined intervals of time from the outside to the control means. The control means reads out the data whose data identification code coincides with the received designation identification code from the storage means and controls the image forming apparatus to display an image based on the read out data for a period of time corresponding to the received display time information. Accordingly, even if the control means fails in reception of a designation identification code and/or display time information sent thereto from the outside, it can try to receive the designation identification code and the display time information again or repeatedly. Therefore, the designation identification code and the display time information can be received with certainty. As a result, for example, even in the case where a designation identification code and display time information are to be received by a plurality of head-mounted type display unit, the plural head-mounted type display units can display the same image at the same time with certainty. Consequently, occurrence of a problem that an image cannot be displayed on a head-mounted type display unit can be prevented with certainty.

In the image displaying method according to the second embodiment of the present invention, the control means reads out one of the plural different size display data of the data whose data identification code coincides with the received designation identification code in response to the distance between the observation object and the head-mounted type display unit from the storage means, and controls the image forming apparatus to display an image based on the one different size display data. Therefore, imbalance between the visually observed size of the observation object and the size of the image is less likely to occur.

In the image displaying method according to the third embodiment of the present invention, the control means reads out one of the plural different language display data of the data whose data identification code coincides with the received designation identification code from the storage means, and controls the image forming apparatus to display an image based on the one different language display data. Therefore, display of an image based on a language used by an observer or spectator can be carried out readily.

In the image displaying method according to the fourth embodiment of the present invention, adjustment of the angle of convergence is carried out in response to the distance from the head-mounted type display unit to the observation object. By the adjustment of the angle of convergence, the distance between the observation object and the observer or spectator and the virtual image distance of images displayed by the image display apparatus can be made equal to each other or can be made equal to each other as far as possible. Consequently, the observer or spectator who watches the observation object can watch images displayed by the image display apparatus naturally without changing the focus thereof very much. In other words, as far as such a state as just described is achieved, it can be regarded that the distance between the observation object and the observer or spectator and the virtual image distance of images displayed by the image display apparatus are equal to each other.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 4 is a schematic view of the head-mounted type display unit as viewed from a side;

FIG. 6 is a schematic view showing the image display apparatus of the head-mounted type display unit in a state mounted on the head with a frame omitted as viewed from above;

DETAILED DESCRIPTION OF THE PREFERRED EMBODIMENTS

Figure 1:
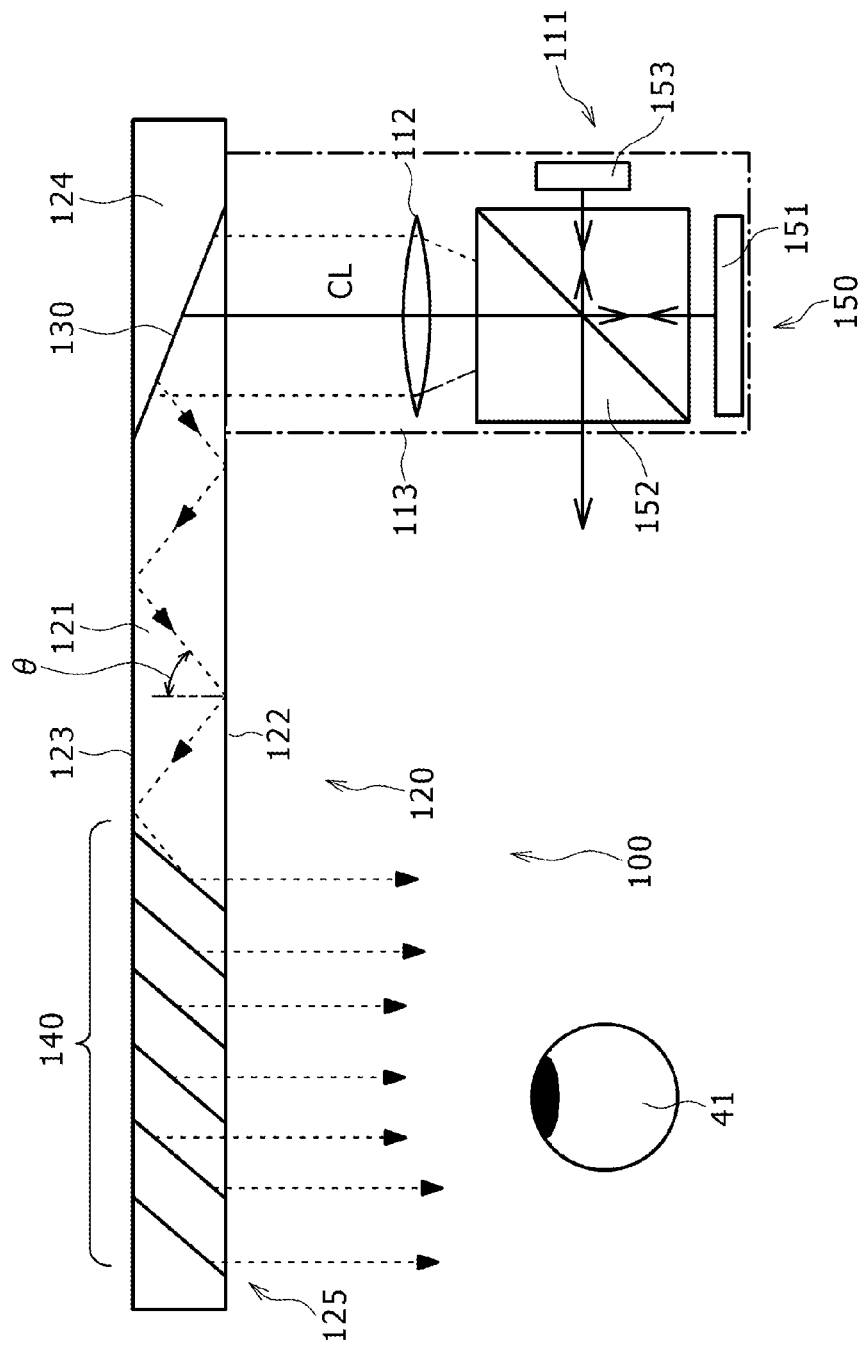
FIG. 1 is a schematic view showing an image display apparatus of a head-mounted type display unit according to a working example 1 of the present invention.

While the present invention is described in detail below in connected with preferred working examples thereof with reference to the accompanying drawings, the present invention is not limited to the working examples and various numerical values and materials specified in the description of the working examples are for illustrative purposes only. It is to be noted that description is given in the following order.

1. General Description of Image Displaying Methods by a Head-Mounted Type Display Unit According to the First to Fourth Embodiments of the Invention
2. Working Example 1 (an image displaying method by the head-mounted type display unit according to the first embodiment of the invention)
3. Working Example 2 (a modification to the working example 1)
4. Working Example 3 (another modification to the working example 1)
5. Working Example 4 (a modification to the working example 3)
6. Working Example 5 (a modification to the working examples 1 to 4)
7. Working Example 6 (a modification to the working example 5)
8. Working Example 7 (a further modification to the working example 1)
9. Working Example 8 (an image displaying method according to the second embodiment of the invention, the image displaying method according to the 1-Ath embodiment of the invention)
10. Working Example 9 (the image displaying method according to the third embodiment of the invention, the image displaying method according to the 1-A'th embodiment of the invention, the image displaying method according to the 1-Bth embodiment of the invention, the image displaying method according to the 2-Ath embodiment of the invention)
11. Working Example 10 (the image displaying method by a head-mounted type display unit according to the fourth embodiment of the invention, the image displaying method according to the 1-Cth embodiment of the invention, the image displaying method according to the 4-Ath embodiment of the invention, the image displaying method according to the 4-A'th embodiment of the invention, the image displaying method according to the 4-Bth embodiment of the invention), others

General Description of Image Displaying Methods by a Head-Mounted Type Display Unit According to the First to Fourth Embodiments of the Invention The image displaying method according to the first embodiment of the present invention may be configured such that each of the data is configured from a plurality of different size display data for different display sizes, and the control section reads out one of the plural different size display data of the data whose data identification code coincides with the received designation identification code from the storage section in response to the distance between an observation object and the head-mounted type display unit, and controls the image forming apparatus to display an image based on the one different size display data.

It is to be noted that such an embodiment as just described is hereinafter referred to as "image displaying method according to the 1-Ath embodiment of the present invention" for the convenience of description.

The image displaying method according to the 1-Ath embodiment of the present invention may be configured such that each of the different size display data is configured from a plurality of different language display data of different display languages, and the control section selects one of the plural different size display data of the data whose data identification code coincides with the received designation identification code in response to the distance between the observation object and the head-mounted type display unit, reads out one of the plural different language display data in the one different size display data from the storage section and controls the image forming apparatus to display an image based on the one different language display data.

It is to be noted that such an embodiment as just described is hereinafter referred to as "image displaying method according to the 1-A'th embodiment of the present invention" for the convenience of description.

Or, the image displaying method according to the first embodiment of the present invention may be configured such that each of the data is configured from a plurality of different language display data of different display languages, and the control section reads out one of the plural different language display data of the data whose data identification code coincides with the received designation identification code from the storage section and controls the image forming apparatus to display an image based on the one different language display data.

It is to be noted that such an embodiment as just described is hereinafter referred to as "image displaying method according to the 1-Bth embodiment of the present invention" for the convenience of description.

The image displaying method according to the first embodiment of the present invention including the image displaying methods according to the 1-Ath embodiment, 1-A'th embodiment and 1-Bth embodiment of the present invention may be configured such that the head-mounted type display unit includes two image forming apparatus for the right eye and the left eye as the image forming apparatus, and the control section carries out data processing in response to the distance between the observation object and the head-mounted type display unit to display images on the image forming apparatus in a state in which an angle of convergence between the images is controlled.

It is to be noted that such an embodiment as just described is hereinafter referred to as "image displaying method according to the 1-Cth embodiment of the present invention" for the convenience of description. Further, it is to be noted that image processing for data to the image forming apparatus which configures at least one of the image display apparatus may be carried out based on the distance from the head-mounted type display unit to the observation object.

Meanwhile, the image displaying method according to the second embodiment of the present invention may be configured such that each of the different size display data is configured from a plurality of different language display data of different display languages, and the control section selects one of the plural different size display data of the data whose data identification code coincides with the received designation identification code in response to the distance between the observation object and the head-mounted type display unit, reads out one of the plural different language display data in the one different size display data from the storage section and controls the image forming apparatus to display an image based on the one different language display data.

It is to be noted that such an embodiment as just described is hereinafter referred to as "image displaying method according to the 2-Ath embodiment of the present invention" for the convenience of description.

Meanwhile, the image displaying method according to the fourth embodiment of the present invention may be configured such that each of the data is configured from a plurality of different size display data for different display sizes, and the control section reads out one of the plural different size display data of the data whose data identification code coincides with the received designation identification code from the storage section in response to the distance between an observation object and the head-mounted type display unit, and carries out data processing in response to the distance between the observation object and the head-mounted type display unit to display images based on the one different size display data on the image forming apparatus in a state in which the angle of convergence between the images is controlled.

It is to be noted that such an embodiment as just described is hereinafter referred to as "image displaying method according to the 4-Ath embodiment of the present invention" for the convenience of description.

Further, the image displaying method according to the 4-Ath embodiment of the present invention may be configured such that each of the different size display data is configured from a plurality of different language display data of different display languages, and the control section selects one of the plural different size display data of the data whose data identification code coincides with the received designation identification code in response to the distance between the observation object and the head-mounted type display unit, reads out one of the plural different language display data in the one different size display data from the storage section, and carries out data processing in response to the distance between the observation object and the head-mounted type display unit to display images based on the one different language display data on the image forming apparatus in a state in which the angle of convergence between the images is controlled.

It is to be noted that such an embodiment as just described is hereinafter referred to as "image displaying method according to the 4-A'th embodiment of the present invention" for the convenience of description.

Or, the image displaying method according to the fourth embodiment of the present invention may be configured such that each of the data is configured from a plurality of different language display data for different display languages, and the control section reads out one of the plural different language display data of the data whose data identification code coincides with the received designation identification code from the storage section in response to the distance between an observation object and the head-mounted type display unit, and carries out data processing in response to the distance between the observation object and the head-mounted type display unit to display images based on the one different language display data on the image forming apparatus in a state in which the angle of convergence between the images is controlled.

It is to be noted that such an embodiment as just described is hereinafter referred to as "image displaying method according to the 4-Bth embodiment of the present invention" for the convenience of description.

The image displaying methods according to the first to fourth embodiments of the present invention including the various preferred embodiments described above may be configured such that the images are displayed on the image forming apparatus in a state in which the luminance of the images is controlled with luminance information.

The luminance information may be signaled from the outside to the head-mounted type display unit. it is to be noted that the luminance information may be signaled by wireless transmission from the outside to the head-mounted type display unit. Or, the head-mounted type display unit may further include a light reception sensor such that the luminance of an image to be displayed on the optical apparatus is controlled based on luminance information of the environment obtained by the light reception sensor, that is, of the atmosphere in which the head-mounted type display unit is placed or an observation object is placed. The light reception sensor may particularly be a photodiode or a light reception element for exposure measurement provided in a camera or an image pickup apparatus hereinafter described.

The image displaying methods according to the second to fourth embodiments of the present invention including the various preferred embodiments and configurations described above may be configured such that a designation identification code and display time information are sent at predetermined intervals of time from the outside to the control section, and the control section controls the image forming apparatus to display the images for a period of time corresponding to the display time information received thereby.

Further, the image displaying methods according to the first to fourth embodiments of the present invention including the various preferred embodiments and configurations described above may be configured such that the designation identification information and the display time information are sent by wireless transmission from a transmission apparatus, and may be configured further such that the transmission apparatus includes a display apparatus and a designation identification code, a data group and total display time of each of data or each of display data of the data group are displayed on the display apparatus. However, transmission of the information is not limited to this, but the information may otherwise be transmitted by wire transmission.

Further, the image displaying methods according to the first to fourth embodiments of the present invention including the various preferred embodiments and configurations described above may be configured such that the optical apparatus is of the semi-transmission or see-through type. Particularly, at least portions of the optical apparatus which opposes to both eyes of the observer are preferably formed in a semi-transparent or see-through state so that an exterior can be watched through the portions of the optical apparatus.

In the image displaying method according to the 1-Ath, 1-A'th, 1-Cth, second, 2-Ath, fourth, 4-Ath, 4-A'th or 4-Bth embodiment of the present invention, the distance between the observation object and the head-mounted type display unit may be set such that the distance information from the observation object to the head-mounted type display unit is signaled from the outside to the head-mounted type display unit. It is to be noted that the distance information may be sent from the outside to the head-mounted type display unit by wireless transmission. Or, the head-mounted type display unit may further include a distance measuring apparatus for measuring the distance from the head-mounted type display unit to the observation object such that distance information is obtained using the distance measuring apparatus. The distance measuring apparatus may particularly be a camera or an image pickup apparatus with an automatic focusing function such as, for example, a camera or an image pickup apparatus which includes a distance measuring apparatus of the active type which irradiates an infrared ray or an ultrasonic wave upon the observation object and detects the distance depending upon the time until a reflection wave returns or the irradiation angle or includes a distance measuring apparatus of the passive type. Or, the distance measuring apparatus may be a distance measuring apparatus for a camera with an automatic focusing function, that is, a distance measuring apparatus of the active type. Or else, a button or switch may be provided on the control section to manually set the distance from the observation object to the head-mounted type display unit.

In the image displaying methods according to the first to forth embodiments of the present invention including the various preferred embodiments and configurations described above, the control section itself may have a known circuit configuration. Also the storage section itself may be known storage section such as, for example, a memory card. Also the transmission apparatus itself may be a known transmission apparatus, and also the display apparatus provided on the transmission apparatus may be a known display apparatus.

Further, the number of data groups may be determined arbitrarily, and also the number of data which configure each data group and the number of display data which configure each data may be determined substantially arbitrarily. As a data structure of the data or the display data, the data may be text data formed, for example, from a character string or may be image data formed from an image of a character string. Further, as display data for different display sizes, text data formed from character strings of different font sizes may be used or image data formed from images of character strings of different font sizes may be used. The display language for the display data may substantially be determined arbitrarily.

The designation identification code and the data identification code may be any code only if it allows identification of the data. For example, numerals, alphabets, and a combination of numerals and alphabets can be used.

Whereas a designation identification code and display time information are sent at predetermined intervals of time from the outside to the control section, in the case where the total display time is represented by $T_{total}$, display time information by $T_{Inf}$ and predetermined time intervals by $T_{int}$, the display time information $T_{Inf}$ can be represented by $$T_{Inf}(m) = T_{total} - (M-1) \times T_{int}$$

where "m" is a positive integer and represents a number of times by which a designation identification code and display time information are sent from the outside to the control section. For example, if $T_{total}$=10.0 seconds
$T_{int}$=0.1 second then the display time information $T_{Inf}(m)$ when a designation identification code and display time information are sent from the outside to the control section at the first time (m=1) is $T_{Inf}(1)$=10.0 seconds.

Further, the display time information $T_{Inf}(m)$ when a designation identification code and display time information are sent from the outside to the control section at the second time (m=2) and the eleventh time (m=11) is $T_{Inf}(2)$=9.9 seconds
$T_{Inf}(11)$=9.0 seconds.

Then, for a period of time corresponding to the display time information $T_{Inf}(m)$, an image based on data or one display data is displayed on the image forming apparatus.

Here, if display of an image by the image forming apparatus is started once, then even if the same designation identification code and different display time information are thereafter received from the outside, the control section may continue to display the image while ignoring the newly received designation identification code and display time information. For such an operation as just described, the control section may use a kind of flag, that is, a reception completion flag. On the other hand, if the control section fails, in the first to (m'−1)th operation cycles, in reception of the designation identification code and/or the display time information from the outside by some reason and then succeeds, in the m'th operation cycle, in reception of the designation identification information and the display time information from the outside for the first time, then the image based on the data or the one display data may be displayed on the image forming apparatus for a period of time of $$T_{Inf}(m') = T_{total} - (m'-1) \times T_{int}.$$

In the image displaying methods according to the first to fourth embodiments of the present invention including the various preferred embodiments and configurations described above (such image displaying methods are sometimes collectively referred to simply as "present invention"), an instruction to signal a designation identification code and display time information for the first operation cycle may be issued, for example, by an operator or under the control of a computer or the like or else in response to a movement of the observation object, a change of voice of a theatrical performer of the observation object, a change of the environment in which the observation object is involved such as, for example, a change in illumination or sound, or the like.

In the image display apparatus which configures the head-mounted type display unit in an embodiment of the present invention (hereinafter referred to simply as "image display apparatus in the present invention"), the optical apparatus may include (a) a light guide plate in and from which light inputted thereto propagates by total reflection and is outputted, (b) a first deflection section configured to deflect the light inputted to the light guide plate so that the light inputted to the light guide plate is totally reflected in the inside of the light guide plate, and (c) a second deflection section configured to deflect the light having propagated in the light guide plate by total reflection by a plural number of times in order that the light propagated in the light guide plate by total reflection is outputted from the light guide plate.

It is to be noted that the term "total reflection" signifies internal total reflection or total reflection in the inside of the light guide plate. This similarly applies also in the following description. Further, the central point of the first deflection section coincides with the central point of the optical axis.

It is to be noted that a point at which a center light ray outputted from the center of the image forming apparatus and passing an image forming apparatus side nodal point of the optical system is inputted to the optical apparatus is determined as an optical apparatus central point. Further, an axial line which passes the optical apparatus central point and extends in parallel to an axial line direction of the optical apparatus is determined as X axis while an axial line which passes the optical apparatus central point and coincides with a normal to the optical apparatus is determined as Y axis. Here, the optical system is disposed between the image forming apparatus and the optical apparatus and converts light outputted from the image forming apparatus into parallel light. Then, a flux of the light converted into the parallel light by the optical system is inputted to, guided by and outputted from the optical apparatus.

The image forming apparatus in the present invention may be configured such that the center light ray crosses with the XY plane at an angle θ other than 0 degree. This decreases restrictions to the attaching angle of the image display apparatus when the image display apparatus is attached to the attaching portion of the frame of the glasses type, and a high degree of freedom in design can be achieved. In this instance, it is preferable from a point of view of handling or setting of the image display apparatus or facility in attachment of the image display apparatus to configure the image forming apparatus such that the center light ray is included in the YZ plane. Further, the optical system may be configured such that the optical axis thereof is included in the YZ plane and besides crosses with the XY plane at an angle other than 0 degree, or such that the optical axis thereof extends in parallel to the YZ plane and also to the XY plane and passes a position displaced from the center of the image forming apparatus. Further, the optical system may be configured such that, when it is assumed that the XY plane coincides with a horizontal plane, the angle θ at which the center light ray crosses with the XY plane is an angle of elevation. In other words, the optical system may be configured such that the center light ray is directed from the lower side of the XY plane toward the XY plane and collides with the XY plane. In this instance, preferably the XY plane crosses with the vertical plane at an angle other than 0 degree, and more preferably, the XY plane crosses with the vertical plane at an angle θ'. It is to be noted that the maximum value of the angle θ' may be 5 degrees though not restricted thereto. Here, the horizontal plane is a plane which includes a line of sight, that is, "horizontal line of sight of an observer," when the observer watches an object positioned in a horizontal direction, that is, an object at infinity in a horizontal direction or the horizon and besides includes the two pupils of the observer positioned horizontally. Further, the vertical plane is a plane perpendicular to the horizontal plane. Or, the optical system may be configured such that the center light ray outputted from the optical apparatus and inputted to the pupils of the observer forms an angle of depression when the observer watches an object positioned in the horizontal direction, for example, an object at infinity in the horizontal direction or the horizon. The angle of depression with respect to the horizontal plane may be, for example, 5 to 45 degrees.

The first deflection section may be configured such that it reflects light inputted to the light guide plate, and the second deflection section may be configured such that it transmits and reflects the light propagated in the inside of the light guide plate by total reflection over a plural number of times. In this instance, the first deflection section may be configured such that it functions as a reflecting mirror and the second deflection section may be configured such that it functions as a semi-transmission mirror.

In such configuration, the first deflection section may be made of, for example, a metal including an alloy and can be configured from a light reflecting film, which is a kind of mirror, for reflecting light inputted to the light guide plate or a diffraction grating for diffracting light inputted to the light guide plate such as, for example, a hologram diffraction grating film. Meanwhile, the second deflection section may be configured from a multilayer lamination structure formed from a large number of laminated dielectric layer films, a half mirror, a polarizing beam splitter or a hologram diffraction grating film. The first deflection section and the second deflection section are disposed or incorporated in the inside of the light guide plate. In particular, the first deflection section is disposed such that it reflects or diffracts parallel light inputted to the light guide plate such that the parallel light is totally reflected in the inside of the light guide plate. Meanwhile, the second deflection section reflects or diffracts the parallel light propagated by total reflection in the inside of the light guide plate over a plural number of times and then outputs the light in the form of parallel light from the light guide plate.

Or, the first deflection section may be configured such that it diffracts light inputted to the light guide plate, and the second deflection section may be configured such that it diffracts the light propagated by total reflection in the inside of the light guide plate over a plural number of times. In this instance, each of the first and second deflection sections may be formed from a diffraction grating element. The diffraction grating element may be formed from a reflection type diffraction grating element or a transmission type diffraction grating element or else one of the diffraction grating elements may be formed from a reflection type diffraction grating element while the other diffraction grating element is formed from a transmission type diffraction grating element. It is to be noted that the reflection type diffraction grating element may be a reflection type volume hologram diffraction grating. The first deflection section formed from a reflection type volume hologram diffraction grating is sometimes referred to as "first diffraction grating member" and the second deflection section formed from a reflection type volume hologram diffraction grating is sometimes referred to as "second diffraction grating member" for the convenience of description.

While the image display apparatus in an embodiment of the present invention may be used to carry out monochromatic image display, for example, of green, in the case where it is used to carry out color image display, the first diffraction grating member or the second diffraction grating member may be configured such that, in order to allow the image display apparatus to be ready for diffraction reflection of P (for example, P=3, and three colors of red, green and blue) kinds of light having different P kinds of wavelength bands or wavelengths, P diffraction grating layers each formed from a reflection type volume hologram diffraction grating are layered. Each diffraction grating layer has formed thereon interference fringes which correspond to one kind of wavelength band or wavelength. Or, in order to allow the image display apparatus to be ready for diffraction reflection of P different kinds of light having P different kinds of wavelength bands or wavelengths, the first diffraction grating member or the second diffraction grating member may be configured from a single diffraction grating layer having P different kinds of interference fringes formed thereon. Or else, an angle of view may be divided, for example, equally into three angles of view such that the first diffraction grating member or the second diffraction grating member is formed from layered diffraction grating layers individually corresponding to the angles of view. By adopting any of the configurations described, increase of the diffraction efficiency, increase of the diffraction reception angle and optimization of the diffraction angle when light having several wavelength bands or wavelengths is diffracted or reflected by the first diffraction grating member or the second diffraction grating member can be anticipated.

A photopolymer material can be used as the material for configuring the first and second diffraction grating elements. The material and the basic structure of the first and second diffraction grating members each formed from a reflection type volume hologram diffraction grating may be same as those of a reflection type volume hologram diffraction grating in related art. The reflection type volume hologram diffraction grating signifies a hologram diffraction grating which diffracts and reflects only positive first order diffraction light. While interference fringes are formed in the diffraction grating members such that they extend from the inside to the surface of the diffraction grating members, the formation method of the interference fringes may be same as a formation method in related art. In particular, for example, object light may be irradiated in a first predetermined direction upon one side of a member such as, for example, a photopolymer material member which is to configure a diffraction grating member while at the same time reference light is irradiated in a second predetermined direction upon the other side of the member which is to configure the diffraction grating member so that interference fringes formed from the object light and the reference light are recorded in the inside of the member which is to configure the diffraction grating member. By suitably selecting the first predetermined direction, second predetermined direction and wavelength of the object light and the reference light, interference fringes having a desired pitch and a desired inclination angle or slanting angle on the surface of the diffraction grating member can be obtained in the diffraction grating member. The inclination angle of interference fringes signifies an angle defined by the surface of the diffraction grating member or diffraction grating layer and the interference fringes. In the case where the first and second diffraction grating members are configured from the laminated structure of P diffraction grating layers formed from a reflection type volume hologram diffraction grating, P diffraction grating layers may be laminated or adhered, for example, using an ultraviolet curing type adhesive after providing each of the P diffraction grating layers. Or, the P diffraction grating layers may be produced by providing a single diffraction grating layer using a photopolymer material having self-bonding properties and successively adhering a photopolymer material having self-bonding properties to the diffraction grating layer to produce P diffraction grating layers.

Or, in the image display apparatus in an embodiment of the present invention, the optical apparatus may be configured from a semi-transmission mirror to which light outputted from the image forming apparatus is inputted and from which the light is outputted toward the pupils of the observer. It is to be noted that the optical apparatus may otherwise be structured such that the light emitted from the image forming apparatus propagates in the air until it is inputted to the semi-transmission mirror. Or, the optical apparatus may be configured such that the light emitted from the image forming apparatus propagates in the inside of a transparent member such as, for example, a glass plate or a plastic plate, particularly a member made of a material same as that which configures the light guide plate hereinafter described, until it is inputted to the semi-transmission mirror. It is to be noted that the semi-transmission mirror may be attached to the image forming apparatus through this transparent member or may be attached to the image forming apparatus through a member different from the transparent member.

In the image display apparatus in the present invention including the various preferred embodiments and configurations described above, the image forming apparatus may be configured such that it includes a plurality of pixels arrayed in a two-dimensional matrix. It is to be noted that the configuration of such an image forming apparatus as just described is hereinafter referred to as "image forming apparatus of the first configuration" for the convenience of description.

The image forming apparatus of the first configuration may be configured as an image forming apparatus which includes, for example, a reflection type spatial light modulation apparatus and a light source, another image forming apparatus which includes a transmission type spatial light modulation apparatus and a light source, or a further image forming apparatus which includes a light emitting element such as an organic EL (Electro Luminescence) element, an inorganic EL element or a light emitting diode (LED). Especially, the image forming apparatus is preferably configured from a reflection type spatial light modulation apparatus and a light source. The spatial light modulation apparatus may be a light valve device, for example, a liquid crystal display apparatus of the transmission type or the reflection type of LCOS (Liquid Crystal On Silicon) or the like, or a digital micromirror device (DMD). The light source may be a light emitting element. Further, the reflection type spatial light modulation apparatus may be configured from a polarizing beam splitter which reflects part of light from the light source so as to be introduced to the liquid crystal display apparatus and then transmits part of light reflected by the liquid crystal display apparatus therethrough so as to be introduced to the optical system. The light emitting element which configures the light source may be a red light emitting element, a green light emitting element, a blue light emitting element or a white light emitting element, or else, red light, green light and blue light emitted from a red light emitting element, a green light emitting element and a blue light emitting element, respectively, are mixed and uniformized in luminance using a light valve device to obtain white light. The light emitting element may be, for example, a semiconductor laser element, a solid-state laser element or an LED. The number of pixels may be determined based on specifications required for the image display apparatus and may be, as a particular value of the number of pixels, 320×240, 432×240, 640×480, 1024×768, 1920×1080 or the like.

Or, in the image display apparatus in the present invention including the various preferred embodiments and configurations described above, the image forming apparatus may be configured such that it includes a light source and a scanning section for scanning parallel light emitted from the light source. It is to be noted that such a configuration of the image forming apparatus as just described is hereinafter referred to as "image forming apparatus of the second configuration" for the convenience of description.

The light source in the image forming apparatus of the second embodiment may be a light emitting element and particularly may be a red light emitting element, a green light emitting element, a blue light emitting element or a white light emitting element, or else, red light, green light and blue light emitted from a red light emitting element, a green light emitting element and a blue light emitting element, respectively, are mixed and uniformized in luminance using a light valve device to obtain white light. The light emitting element may be, for example, a semiconductor laser element, a solid-state laser element or an LED. The number of pixels, that is, virtual pixels, in the image forming apparatus of the second configuration may also be determined based on specifications required for the image display apparatus and may be, as a particular value of the number of pixels or virtual pixels, 320×240, 432×240, 640×480, 1024×768, 1920×1080 or the like. Further, in the case where color image display is to be carried out and the light source is configured from a red light emitting element, a green light emitting element and a blue light emitting element, for example, a cross prism is preferably used to carry out color synthesis. The scanning section may be, for example, an MEMS (Micro Electro Mechanism System) having micromirrors rotatable in two-dimensional directions or a galvano-mirror which scans emitted from the light source horizontally and vertically.

In the image forming apparatus of the first configuration or the second configuration, light converted into a plurality of parallel light beams by an optical system (which is an optical system which converts emitted light into parallel light and is sometimes called "parallel light outputting optical system," and particularly is, for example, a collimate optical system or a relay optical system) is inputted to the light guide plate. The requirement for such parallel light is based on the fact that it is necessary for light wave front information when such light beams are inputted to the light guide plate to be maintained also after the light beams are outputted from the light guide plate through the first and second deflection sections. It is to be noted that, in order to produce a plurality of parallel light beams, for example, a light outputting portion of the image forming apparatus may be positioned particularly, for example, at the position of a focal distance of a parallel light outputting optical system. The parallel light outputting optical system has a function of converting position information of a pixel into angle information of the optical system of the optical apparatus. The parallel light outputting optical system may be a convex lens, a concave lens, a sculptured surface prism or a hologram lens used by itself or in combination such that the optical system generally has positive optical power. A light blocking member having an opening may be disposed between the parallel light outputting optical system and the light guide plate so as to prevent undesirable light from being outputted from the parallel light outputting optical system and inputted to the light guide plate.

The light guide plate has two parallel faces, that is, a first face and a second face, extending in parallel to the axial line of the light guide plate, that is, the X axis. If the face of the light guide plate to which light is inputted is referred to as light guide plate inputting face and the face of the light guide plate from which light is outputted is referred to as light guide plate outputting face, then the light guide plate inputting face and the light guide plate outputting face may be formed from the first face, or the light guide plate inputting face may be formed from the first face while the light guide plate outputting face is formed from the second face. The material for configuring the light guide plate may be a glass material including quartz glass and optical glass such as BK7 or a plastic material such as, for example, PMMA, a polycarbonate resin, an acrylic resin, an amorphous polypropylene resin or a styrene-based resin including an AS resin. The shape of the light guide plate is not limited to a flat shape but may be a curved shape.

In the head-mounted type display unit in the present invention, the frame may include a front portion disposed on the front of an observer, and two temple portions attached for pivotal motion to the opposite ends of the front portion by hinges. It is to be noted that a modern portion is attached to an end portion of each of the temple portions. While, the image display apparatus is attached to the frame, particularly it may be attached to each of the temple portions.

Further, the head-mounted type display unit in an embodiment of the present invention may be configured such that a nose pad is attached thereto. In particular, when the entirety of the head-mounted type display unit in the present invention is watched, an assembly of the frame and the nose pad has a structure substantially same as that of ordinary eyeglasses. It is to be noted that the assembly may have or may not have rim portions. The material of the frame may be same as that used to configure ordinary eyeglasses such a metal, an alloy, a plastic material or a combination of such materials. Also the nose pad may have a known configuration and structure.

As described hereinabove, an image pickup apparatus may be attached to a central portion of the front portion. The image pickup apparatus is configured particularly from a solid-state image pickup element formed from, for example, a CCD or CMOS sensor, and a lens. Wiring lines from the image pickup apparatus may be connected to one of the image display apparatus or the image forming apparatus, for example, through the front portion, or may be included in wiring lines extending from the image display apparatus or the image forming apparatus.

In the head-mounted type display unit in the present invention, from a point of view of the design or facility in mounting, preferably wiring lines such as signal lines and power supply lines extending from one or two image display apparatus or image forming apparatus extend through the temple portion or portions and the inside of the modern portion or portions and outwardly from the end portion of the modern portion or portions and connected to the control section such as a control apparatus or a control circuit. Further, each image display apparatus or image forming apparatus may include a headphone section such that wiring lines for the headphone from the image display apparatus or image forming apparatus extend through the temple portion and the inside of the modern portion and further from the end portion of the modern portion to the headphone portion. The headphone section may be, for example, a headphone section of the inner ear type or of the canal type. Preferably, the wiring lines for the headphone extend more particularly from the end portion of the modern portion to the headphone section in such a manner as to go round the rear side of the auricle or auditory capsule.

The head-mounted type display unit in the embodiment can be used, for example, for display of the subtitles of movies or the like; for display of explanations or closed captions regarding an image synchronized with a screen image; for display for various explanations regarding an observation object in dramatic performances, Kabuki, Noh performances, Noh farces, operas, music concerts, ballets, various theatrical performances, amusement parks, art museums, tourist resorts, holiday resorts, sightseeing brochures and so forth, and explanations regarding the contents, progressing situations, backgrounds and so forth; for display of various explanations, symbols, marks, signs, emblems, designs and so forth in driving, operation, maintenance, disassembly and so forth of observation objects of various apparatus and so forth; display of various explanations, symbols, marks, signs, emblems, designs and so forth regarding observation objects regarding persons, articles and so forth; and display of a closed caption. In the dramatic performances, Kabuki, Noh performances, Noh farces, operas, music concerts, ballets, various theatrical performances, amusement parks, art museums, tourist resorts, holiday resorts, sightseeing brochures and so forth, characters as an image relating to an observation object may be displayed at an appropriate timing on the image display apparatus. In particular, for example, in conformity with a progressing situation of a movie or the like or in conformity with a progressing situation of a dramatic performance, a designation identification code is signaled to the control section in accordance with a predetermined schedule and allotment of time in response to an operation of an operator or under control by a computer or the like so that an image of characters is displayed on the image display apparatus.

The information to the image forming apparatus may include, as described above, for example, luminance information or luminance data or else chromaticity information or chromaticity data regarding the characters to be displayed or luminance information and chromaticity information. The luminance information or luminance data may be luminance information corresponding to the luminance of a predetermined region including an observation object watched through the optical apparatus, and the chromaticity information or chromaticity data may be chromaticity information corresponding to a chromaticity of a predetermined region including an observation object watched through the optical apparatus. If luminance information regarding characters is included in this manner, then control of the luminance or brightness of the characters to be displayed can be carried out. Further, if chromaticity information regarding characters is included, then control of the chromaticity or color of the characters to be displayed can be carried out. Further, if luminance information and chromaticity information regarding characters are included, then control of the luminance or brightness and the chromaticity or color of the characters to be displayed can be carried out. In the case where the luminance information corresponds to the luminance of a predetermined region including an observation object watched through the image display apparatus, the value of the luminance information may be set such that, as the value of the luminance of the predetermined region including the observation object watched through the image display apparatus increases, the value of the luminance of the image increases, that is, the image is displayed brighter. Meanwhile, in the case where the chromaticity information corresponds to the chromaticity of a predetermined region including an observation object watched through the image display apparatus, the value of the chromaticity may be set such that the chromaticity of the predetermined region including the observation object watched through the image display apparatus and the chromaticity of the image to be displayed may have a substantially complementary color relationship to each other. Complementary colors represent a combination of colors which are positioned on the exactly opposite positions of a color circle. A complementary color is complementary to a certain color such as green to red, purple to yellow or orange to blue. Complementary colors are used also with regard to different colors which cause degradation of the saturation to white in the case of light and to black in the case of substance when the colors are mixed at a suitable ratio. However, the complementarity of the visual effect when the colors are juxtaposed with each other and the complementarity when the colors are mixed are different from each other. A complementary color is also called opposite color. However, while the opposite color directly denotes a color opposite to a complementary color, the range denoted by the complementary color is a little broader. A combination of complementary colors has a combined effect that they enhance the opposite colors to each other, and this is called complementary color harmony.

Working Example 1

Figure 2:
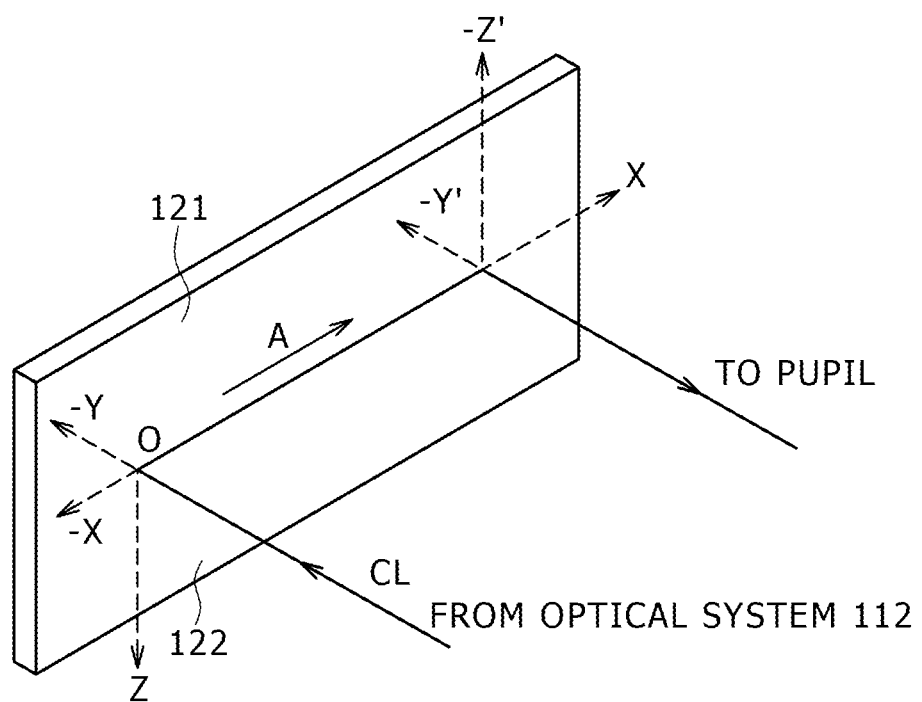
FIG. 2 is a schematic view illustrating propagation of light in and around a light guide plate of the image display apparatus.
Figure 3:
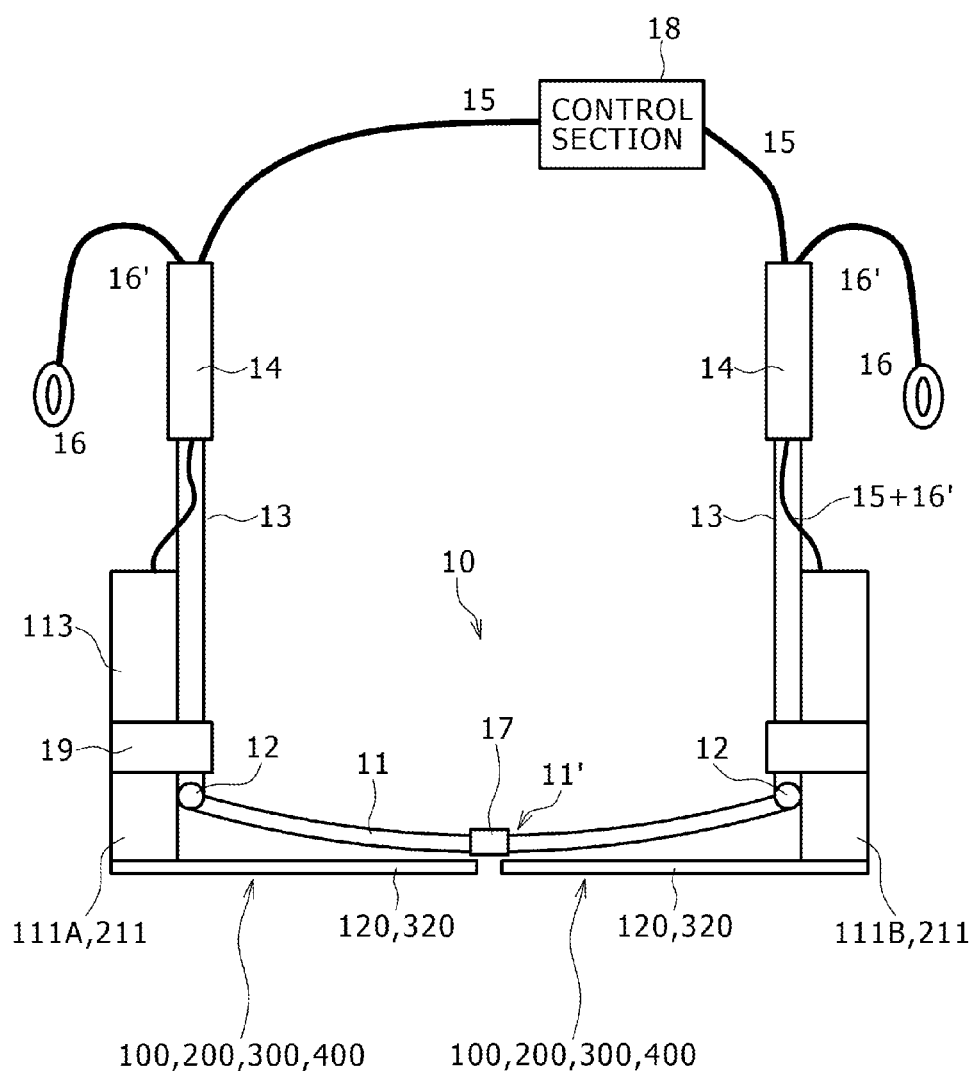
FIG. 3 is a schematic view of the head-mounted type display unit as viewed from above.
Figure 5:
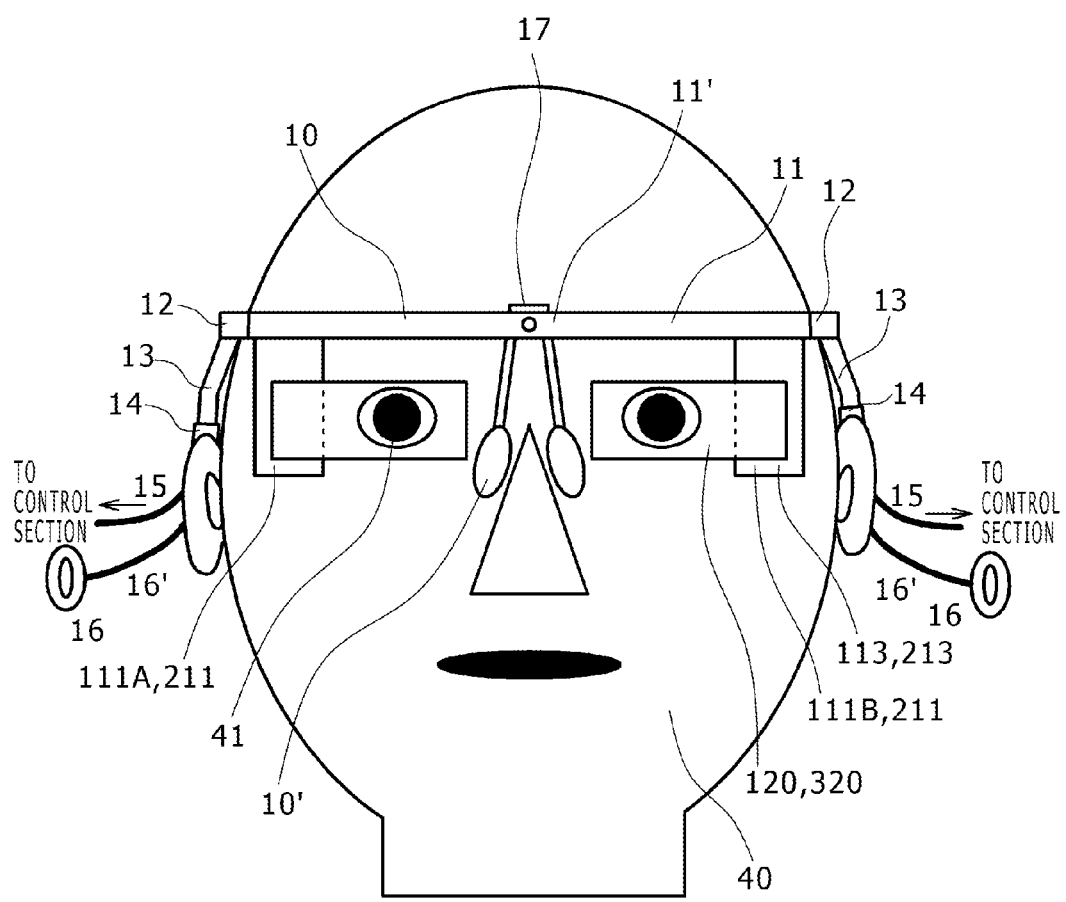
FIG. 5 is a schematic view of the head-mounted type display unit as viewed from the front.
Figure 7:
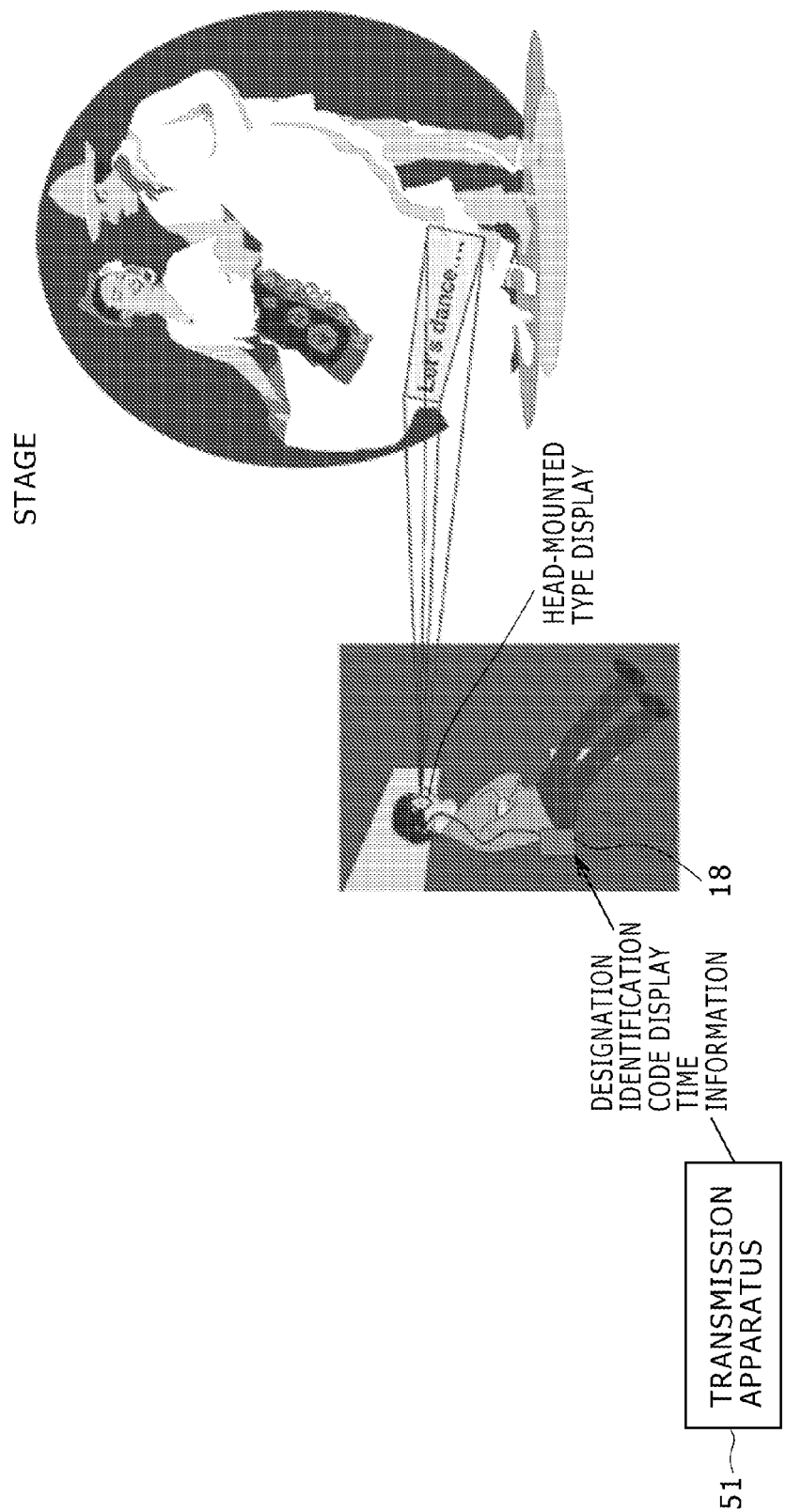
FIGS. 7 and 8 are schematic views of the head-mounted type display unit in different used states.
Figure 8:
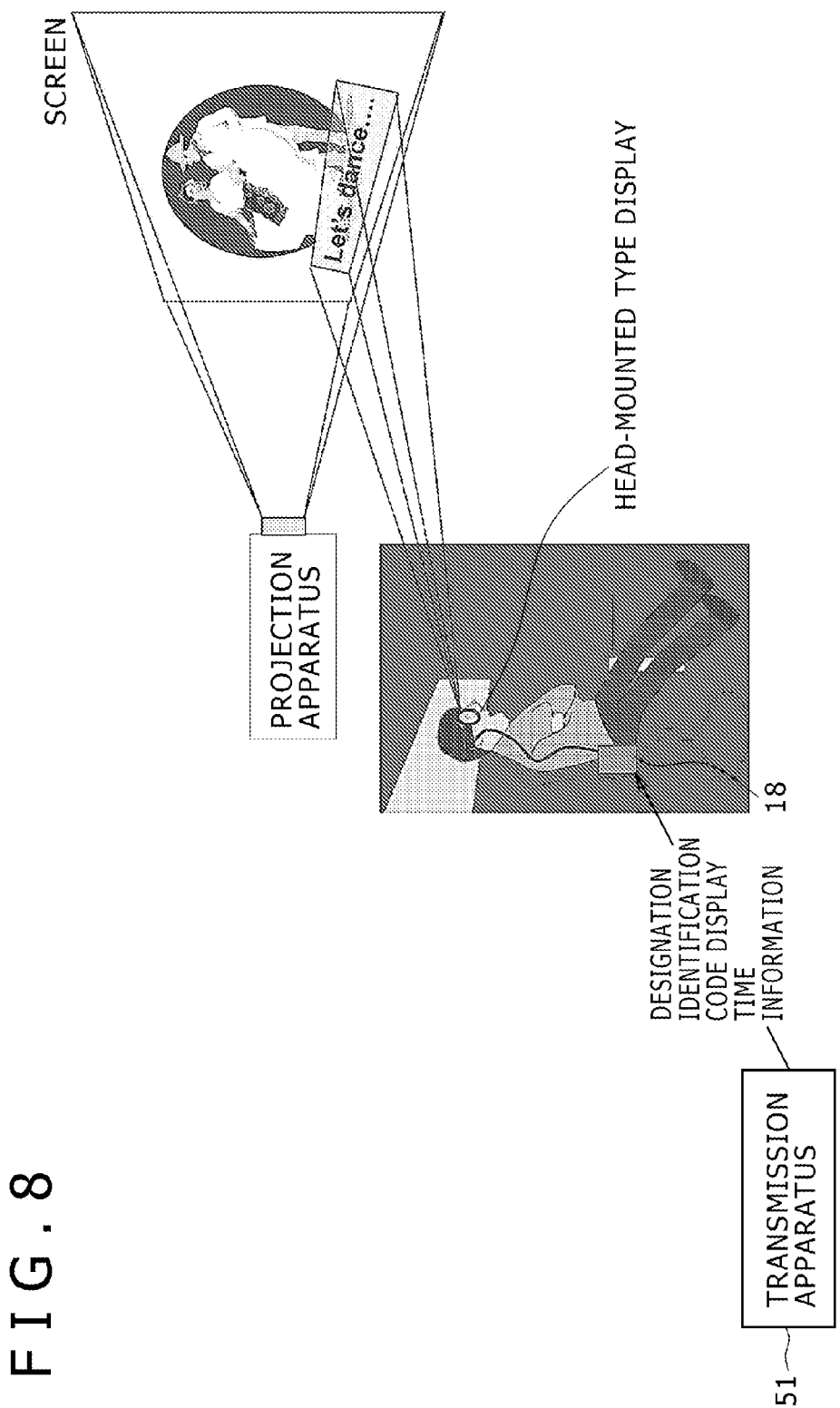
Figure 9:
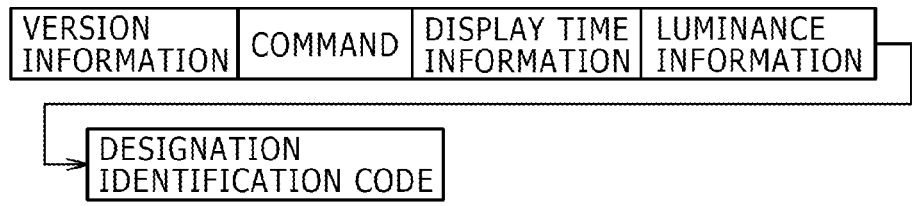
FIG. 9 is a diagrammatic view illustrating a file structure of data which configure a data group in the head-mounted type display unit.
Figure 10A:
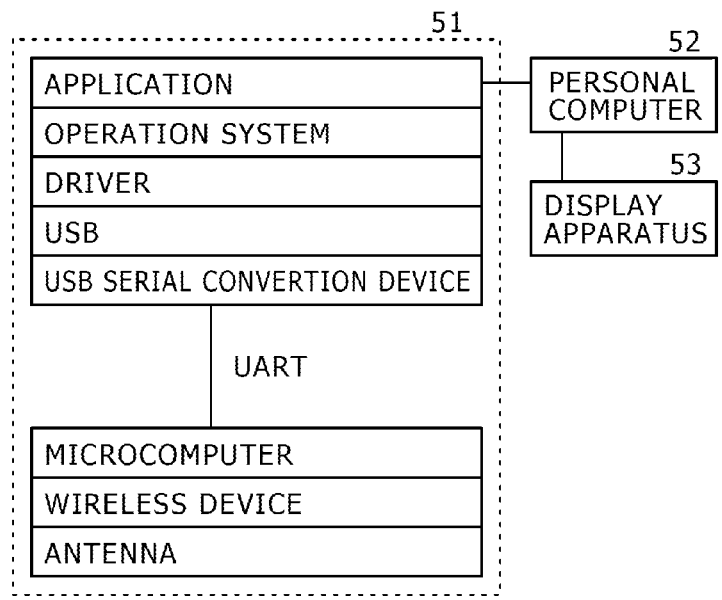
FIGS. 10A and 10B are system block diagrams of a transmission apparatus and a control section of the head-mounted type display unit, respectively.
Figure 10B:
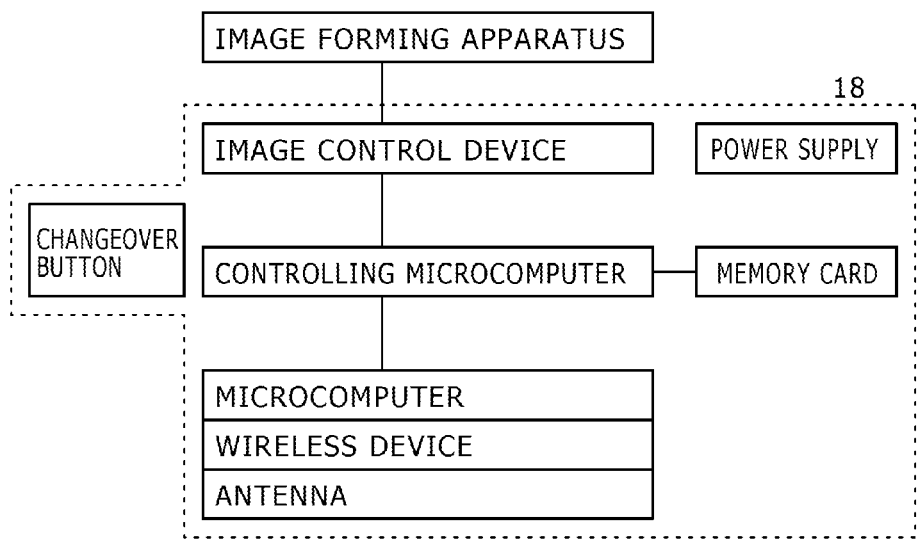
Figure 11:
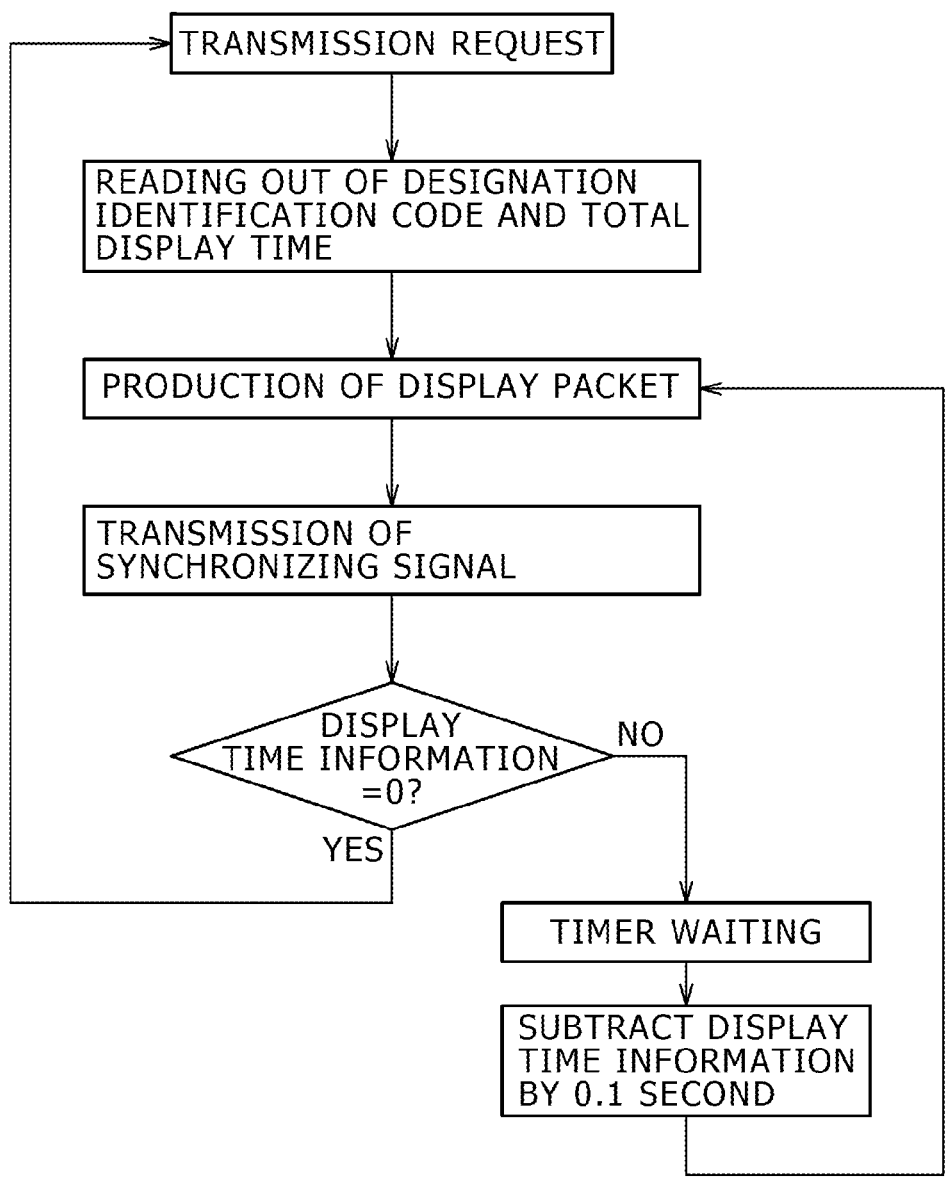
FIG. 11 is a flow chart illustrating a flow of a transmission process by the transmission apparatus.
Figure 12:
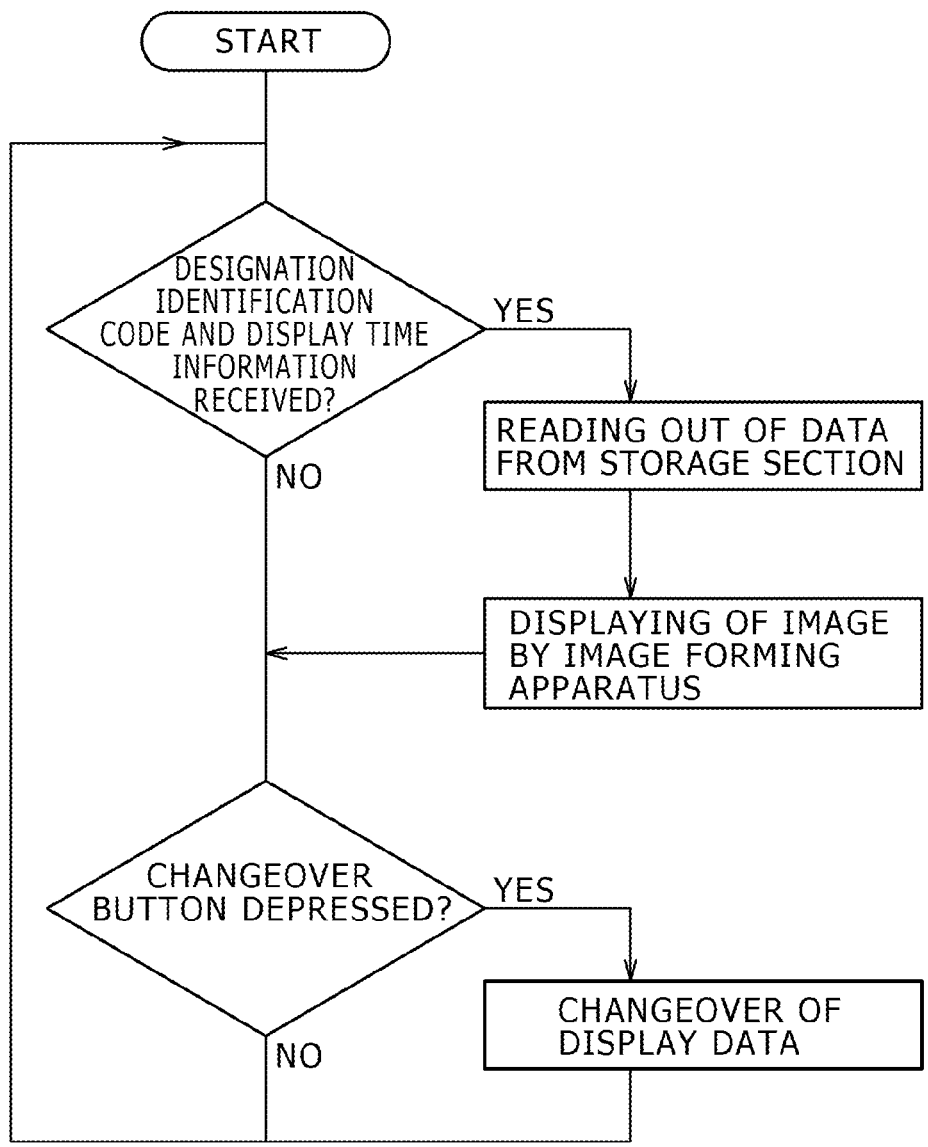
FIG. 12 is a flow chart illustrating a reception process of the head-mounted type display unit.

A working example 1 relates to an image displaying method for a head-mounted type display unit according to a first embodiment of the present invention. It is to be noted that, in the following description, the "image displaying method for a head-mounted type display unit" is referred to simply as "image display method." A schematic view showing an image display apparatus of the head-mounted type display unit according to the working example 1 is shown in FIG. 1. Meanwhile, a schematic view illustrating propagation of light in and around a light guide plate which configures the image display apparatus in the head-mounted type display unit of the working example 1 is shown in FIG. 2. A schematic view of the head-mounted type display unit as viewed from above is shown in FIG. 3. A schematic view of the head-mounted type display unit as viewed from a side is shown in FIG. 4. Further, a schematic view of the head-mounted type display unit of the working example 1 as viewed from the front is shown in FIG. 5. A schematic view of the image display apparatus of the head-mounted type display unit of the working example 1 in a state mounted on the head of an observer as viewed from above is shown in FIG. 6 with a frame omitted while only the image display apparatus is shown. Schematic views of the head-mounted type display unit of the working example 1 in different used states are shown in FIGS. 7 and 8. Further, a diagrammatic view illustrating a data structure of data which configure a data group in the head-mounted type display unit of the working example 1 is illustrated in FIG. 9. System block diagrams of a transmission apparatus and a control section of the head-mounted type display unit are shown in FIGS. 10A and 10B, respectively. A flow chart illustrating a flow of a transmission process by the transmission apparatus in the head-mounted type display unit of the working example 1 is shown in FIG. 11, and a flow chart illustrating a reception process of the head-mounted type display unit in the working example 1 is shown in FIG. 12.

The head-mounted type display unit in the working example 1 or in any of the working examples 2 to 10 hereinafter described includes (a) a frame 10 of the glasses type for being mounted on the head of an observer 40, (b) two image display apparatus 100, 200, 300, 400 or 500 for the right eye and the left eye attached to the frame 10, and (c) a control section 18 configured to control image display on the image display apparatus 100, 200, 300, 400 or 500.

Each of the image display apparatus 100, 200, 300, 400 or 500 includes (A) an image forming apparatus 111 or 211, and (B) an optical apparatus 120, 320 or 520 to which light outputted from the image forming apparatus 111 or 211 is inputted and by and from which the light is guided and outputted.

It is to be noted that the image display apparatus 100, 200, 300, 400 or 500 further includes (C) an optical system or parallel light outputting optical system 112 or 254 for converting the light outputted from the image forming apparatus 111 or 211 into parallel light.

Here, the optical system 112 or 254 is disposed between the image forming apparatus 111 or 211 and the optical apparatus 120, 320 or 520. Thus, a flux of light after converted into parallel light by the optical system 112 or 254 is inputted to, guided by and outputted from the optical apparatus 120, 320 or 520. The image forming apparatus 111 or 211 displays an image of a single color (green, for example). The optical apparatus 120, 320 or 520 is of the semi-transmission type, that is, of the see-through type. In particular, at least portions of the optical apparatus which are opposed to both eyes of the observer 40, more particularly a light guide plate 121 or 321 and a second deflection section 140 or 340 to be described later, have a semi-transmission property or see-through property. It is to be noted that, in the working example 1 or in any of the working examples 2 to 9, the head-mounted type display unit is formed as an apparatus of the binocular type including two image display apparatus, according to circumstances, the head-mounted type display unit may be configured as an apparatus of the monocular type including a single image display apparatus.

It is to be noted that, in the working example 1 or in any of the working examples 2 to 10 to be described later, a point at which a center light ray CL outputted from the center of the image forming apparatus 111 or 211 and passing an image forming apparatus side nodal point of the optical system 112 or 254 is inputted to the optical apparatus 120, 320 or 520 is determined as an optical apparatus central point O. Further, an axial line which passes the optical apparatus central point O and extends in parallel to an axial line direction of the optical apparatus 120, 320 or 520 is determined as X axis while an axial line which passes the optical apparatus central point O and coincides with a normal to the optical apparatus 120, 320 or 520 is determined as Y axis. It is to be noted that the central point of a first deflection section 130 or 330 described below is the optical apparatus central point O.

Further, the optical apparatus 120 or 320 in the working example 1 or in any of the working examples 2 to 6 to be described later includes (a) a light guide plate 121 or 321 in and from which light inputted thereto propagates by total reflection and is outputted, (b) a first deflection section 130 or 330 configured to deflect the light inputted to the light guide plate 121 or 321 so that the light inputted to the light guide plate 121 or 321 is totally reflected in the inside of the light guide plate 121 or 321, and (c) a second deflection section 140 or 340 configured to deflect the light having propagated in the light guide plate 121 or 321 by total reflection by a plural number of times in order that the light propagated in the light guide plate 121 or 321 by total reflection is outputted from the light guide plate 121 or 321.

In the working example 1, the first deflection section 130 and the second deflection section 140 are disposed in the inside of the light guide plate 121. The first deflection section 130 reflects light inputted to the light guide plate 121, and the second deflection section 140 transmits and reflects the light, which has propagated by total reflection in the inside of the light guide plate 121, over a plural number of times. In other words, the first deflection section 130 functions as a reflecting mirror, and the second deflection section 140 functions as a semi-transmission mirror. More particularly, the first deflection section 130 provided in the inside of the light guide plate 121 is configured from a light reflecting film, that is, a kind of mirror, made of aluminum (Al) for reflecting light inputted to the light guide plate 121. Meanwhile, the second deflection section 140 provided in the inside of the light guide plate 121 is configured from a multilayer lamination structure formed from a large number of laminated dielectric layer films. The dielectric layer films are configured, for example, from a $TiO_2$ film as a high dielectric material and a $SiO_2$ film as a low dielectric material. The multilayer lamination structure formed from a large number of laminated dielectric layer films is disclosed in JP-T-2005-521099. While a dielectric lamination film of six layers is shown in FIG. 1, the dielectric lamination film is not limited to this. Between the dielectric lamination films, a lamina made of a material same as that of the light guide plate 121 is sandwiched. It is to be noted that, by the first deflection section 130, parallel light inputted to the light guide plate 121 is reflected or diffracted such that the parallel light is totally reflected in the inside of the light guide plate 121. Meanwhile, by the second deflection section 140, the parallel light having propagated by total reflection in the inside of the light guide plate 121 is reflected or diffracted over a plural number of times and is outputted in a state of parallel light from the light guide plate 121 toward the pupil 41 of the observer 40.

The first deflection section 130 may be configured such that a portion 124 of the light guide plate 121 at which the first deflection section 130 is to be provided is cut away to provide an inclined face on which the first deflection section 130 is to be formed on the light guide plate 121 and the light reflecting film is formed on the inclined face by vapor deposition, whereafter the portion 124 cut away from the light guide plate 121 is adhered to the first deflection section 130. On the other hand, the second deflection section 140 may be configured in the following manner. In particular, a multilayer lamination structure wherein a large number of layers including a material same as the material of the light guide plate 121 such as glass and a dielectric lamination film, which can be formed, for example, by vacuum deposition is produced. Then, a portion 125 of the light guide plate 121 at which the second deflection section 140 is to be provided is cut away to form an inclined face, and a multilayer lamination structure is adhered to the inclined face, whereafter polishing and so forth are carried out to arrange the outer profile. The optical apparatus 120 wherein the first deflection section 130 and the second deflection section 140 are provided in the inside of the light guide plate 121 can be obtained in this manner.

Here, in the working example 1 or in any of the working examples 2 to 6 to be described later, the light guide plate 121 or 321 formed from optical glass or a plastic material has two parallel faces, that is, a first face 122 or 322 and a second face 123 or 323, extending in parallel to the light propagation direction, that is, the X-axis direction, by the internal total reflection in the light guide plate 121 or 321. The first face 122 or 322 and the second face 123 or 323 face to each other. Thus, after parallel light inputted from the first face 122 or 322 which corresponds to a light inputting face propagates by total reflection in the inside of the light guide plate 121 or 321, it is outputted from the first face 122 or 322 which corresponds to a light outputting face. However, the configuration of the light guide plate 121 or 321 is not limited to this, but a light inputting face may be configured from the second face 123 or 323 while a light outputting face is configured from the first face 122 or 322.

In the working example 1 or the working example 3 hereinafter described, the image forming apparatus 111 has a first configuration and has a plurality of pixels arrayed in a two-dimensional matrix. In particular, the image forming apparatus 111 is configured from a reflection type spatial light modulation apparatus 150 and a light source 153 formed from a light emitting diode which emits white light. Each image forming apparatus 111 is accommodated in a housing 113 indicated by an alternate long and short dash line in FIG. 1 or 15, and an opening not shown is provided in the housing 113 so that light is outputted from the optical system 112, which is a parallel light outputting optical system or collimate optical system, through the opening. The reflection type spatial light modulation apparatus 150 is configured from a liquid crystal display (LCD) apparatus 151 formed from an LCOS as a light valve, and a polarizing beam splitter 152 for reflecting part of light from the light source 153 so as to be introduced to the liquid crystal display apparatus 151 and transmitting part of the light reflected by the liquid crystal display apparatus 151 so as to be inputted to the collimate optical system 112. The liquid crystal display apparatus 151 includes a plurality of, for example, 640×480, pixels, that is, liquid crystal cells, arrayed in a two-dimensional matrix. The polarizing beam splitter 152 has a known configuration and structure. Light in the form of a non-polarized light emitted from the light source 153 comes to the polarizing beam splitter 152. A P polarized light component of the inputted light is transmitted through the polarizing beam splitter 152 and goes out to the outside of the system. Meanwhile, an S polarized light component of the inputted light is reflected by the polarizing beam splitter 152 and inputted to the liquid crystal display apparatus 151, in the inside of which it is reflected. Thereafter, the S polarized light is outputted from the liquid crystal display apparatus 151. Here, light emitted from those pixels which display the "white" from within the light outputted from the liquid crystal display apparatus 151 includes much P polarized light component, and light emitted from those pixels which display the "black" includes much S polarized light. Accordingly, a P polarized light component from within light emitted from the liquid crystal display apparatus 151 and coming to the polarizing beam splitter 152 is transmitted through the polarizing beam splitter 152 and inputted to the collimate optical system 112. On the other hand, an S polarized light component is reflected by the polarizing beam splitter 152 and returned to the light source 153. The collimate optical system 112 is configured, for example, from a convex lens, and in order to produce parallel light, the image forming apparatus 111, more particularly, the liquid crystal display apparatus 151, is disposed at a position of the focal distance of the collimate optical system 112.

The frame 10 includes a front portion 11 disposed in front of the observer 40, two temple portions 13 attached for pivotal motion to the opposite ends of the front portion 11 through hinges 12, and modern portions 14 also called end cells or ear pads individually attached to end portions of the temple portions 13. Further, a nose pad 10' is attached to the frame 10. In particular, an assembly of the frame 10 and the nose pad 10' basically has a substantially same structure as that of ordinary glasses. Further, the housings 113 are attached to the temple portions 13 by attaching members 19. The frame 10 is made of a metal or plastic material. It is to be noted that the housings 113 may be removably attached individually to the temple portions 13 by the attaching members 19. Further, on an observer who owns and wears the glasses, the housings 113 may be removably attached to temple portions of the frame of the glasses owned by the observer by means of the attaching members 19.

Further, wiring lines 15 which may include signal lines, power supply lines and so forth extend from the image forming apparatus 111A and 111B. The wiring lines 15 extend through the inside of the temple portions 13 and the modern portions 14 to the outside from the end portions of the modern portions 14 and are connected to a control section 18, which is a control circuit or a control apparatus. Further, each of the image forming apparatus 111A and 111B includes a headphone portion 16, and headphone portion wiring lines 16' extending from the image forming apparatus 111A and 111B extend from the end portions of the modern portions 14 to the headphone portions 16 through the temple portions 13 and the inside of the modern portions 14. More particularly, the headphone portion wiring lines 16' extend from the end portions of the modern portions 14 to the headphone portions 16 in such a manner as to go round the rear side of the auricles or auditory capsules. By using such a configuration as just described, the head-mounted type display unit can be formed clear-cut without giving such an impression that the headphone portions 16 and/or the headphone portion wiring lines 16' are disposed disorderly.

An image pickup apparatus 17 is attached to a central portion 11' of the front portion 11 with an appropriate attaching member (not shown). The image pickup apparatus 17 is configured from a solid-state image pickup device formed from a CCD or CMOS sensor and a lens both not shown. A signal from the image pickup apparatus 17 is signaled to the image forming apparatus 111A through wiring lines not shown extending from the image pickup apparatus 17.

In the image displaying method of the working example 1, it is assumed that a conversation and so forth of performers in a theatrical performance are displayed on the head-mounted type display unit. A data group is stored in storage section not shown formed from a memory card provided in the control section 18 formed from a known circuit configuration. In the working example 1, the data group is a set of data in the form of image data of an image of a character string obtained by editing a conversation and so forth of performers in a theatrical performance, for example, scene by scene. Substantially the image data may have an arbitrary file format. FIG. 9 illustrates a concept of a data structure of data which configure the data group. Here, each of the data which configure the data group has a designation identification code applied thereto. The designation identification code is formed, for example, from numerals.

System block diagrams of the transmission apparatus or transmission section 51 in the working example 1 and the control section 18 of the head-mounted type display unit are shown in FIGS. 10A and 10B, respectively. Further, a flow chart illustrating a flow of a transmission process by the transmission apparatus 51 in the working example 1 is shown in FIG. 11, and a flow chart illustrating a reception process of the control section 18 in the working example 1 is shown in FIG. 12.

Figures 13A, 13B:
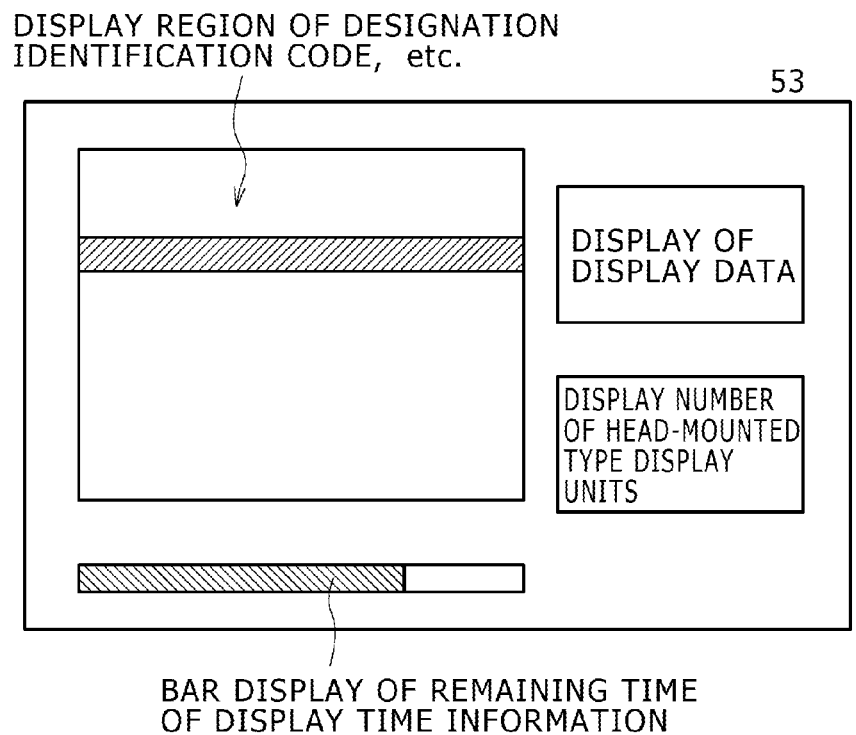
FIG. 13A is a view illustrating contents displayed on a display apparatus which configures the transmission apparatus and including a designation identification code, a data group and a plurality of data which configure the data group
FIG. 13B is a schematic view showing a display image on the display apparatus of the transmission apparatus.

Referring to FIGS. 10A to 12, the transmission apparatus 51 having a known circuit configuration includes, for example, a personal computer 52 and a display apparatus 53 which is formed from a known liquid crystal display apparatus. The display apparatus 53 displays, for example, a designation identification code, a plurality of data which configure a data group and total display time of the data as well as luminance information as seen in FIGS. 13A and 13B. It is to be noted that the display apparatus 53 further has a region provided thereon for displaying display data such as different size display data and/or different language display data which configure the data and a region for displaying the number of head-mounted type display units which receive various information from the transmission apparatus 51. Further, the display apparatus 53 includes a region for displaying a ratio of the display time information $T_{Inf}$ to the total display time $T_{total}$ in the form of a "horizontal bar." In the "display region for a designation identification information code and so forth," a portion represented by slanting lines indicates a line on which a cursor is placed and the display color is reversed.

Then, immediately before a certain conversation of performers in a theatrical performance begins, a designation identification code and display time information are sent at predetermined intervals of time from the outside to the control section 18. In particular, for example, if an operator operates a pointing device or a keyboard not shown provided in the personal computer 52 to designate a line on which a designation identification code, a plurality of data configuring a data group and total display time of the individual data displayed on the display apparatus 53 are indicated, then the personal computer 52 reads out the designated designation identification code and total display time. Then, the personal computer 52 determines display time information, produces a display packet and transmits the designation identification code and display time information toward the control section 18 of the head-mounted type display unit together with a synchronizing signal. It is to be noted that the pointing device may be, for example, a joystick, a pointing stick or track point, a touch pad, a touch panel, a stylus pen, a data glove, a track ball, a pen tablet, a mouse, a light pen or a joy pad.

In particular, as described hereinabove, the display time information $T_{Inf}$ can be represented, using the total display time $T_{total}$ and predetermined time intervals $T_{int}$, by $$T_{Inf}(m)=T_{total}-(m-1)\times T_{int}.$$

Then, the designation identification code and the display time information $T_{Inf}$ are sent at predetermined time intervals $T_{int}$ from the outside, that is, from the transmission apparatus 51, to the control section 18. For example, if $T_{total}$=10.0 seconds
$T_{int}$=0.1 second then the display time information $T_{Inf}(m)$ when the designation identification code and the display time information are sent from the outside, that is, from the transmission apparatus 51, to the control section 18 at the first time (m=1) is $T_{Inf}(1)$=10.0 seconds.

In the transmission apparatus 51, it is checked whether or not the display time information $T_{Inf}$ is $T_{Inf}$=0 second. If it is decided that the display time information $T_{Inf}$ is not 0 second, then a timer waiting state is entered, and then the display time information $T_{Inf}$ is decremented by the predetermined time intervals $T_{int}$, particularly by 0.1 second. Then, after lapse of the predetermined time intervals $T_{int}$, particularly after lapse of 0.1 second, the display time information $T_{Inf}$ is determined as $T_{Inf}(2)$=9.9 seconds and the designation identification information and the display time information $T_{Inf}(2)$ are signaled. This is repeated until the display time information $T_{Inf}$ becomes $T_{Inf}$=0 second.

When the control section 18 receives the designation identification code and the data identification code, it reads out data whose data identification code coincides with the received designation identification code from the storage section. Then, within a period of time corresponding to the received display time information $T_{Inf}$, images based on the data are displayed on the image forming apparatus 111A and 111B. Here, if display of images by the image forming apparatus 111A and 111B is started, then even if the same designation identification code and different display time information $T_{Inf}$ are sent from the outside, that is, from the transmission apparatus 51 to the control section 18, the control section 18 continues to display the images ignoring the newly sent designation identification code and display time information $T_{Inf}$. For such an operation as just described, the control section 18 may use a flag, that is, a reception completion flag. On the other hand, if the control section 18 fails, in the first to (m'−1)th operation cycles, in reception of the designation identification code and the display time information $T_{Inf}$ from the transmission apparatus 51 by some reason and then succeeds, in the m'th operation cycle, in reception of the designation identification information and the display time information $T_{Inf}(m')$ from the transmission apparatus 51 for the first time, then the images based on the data are displayed on the image forming apparatus 111A and 111B for a period of time of $$T_{Inf}(m')=T_{total}-(m'-1)\times T_{int}.$$

In this manner, in the image displaying method of the working example 1, even if the control section fails in reception of a designation identification code and/or display time information sent thereto from the outside, it can try to receive the designation identification code and the display time information again or repeatedly. Therefore, the designation identification code and the display time information can be received with certainty. As a result, for example, even in the case where a designation identification code and display time information are to be received by a plurality of head-mounted type display unit, the plural head-mounted type display units can display the same image at the same time with certainty. Consequently, occurrence of a problem that an image cannot be displayed on a head-mounted type display unit can be prevented with certainty.

In the working example 1, an image can be displayed on each of the image forming apparatus 111A and 111B in a state in which the luminance is controlled with luminance information. In particular, if, in addition to a designation identification code and display time information, luminance of an image to be displayed by an optical apparatus is signaled from the outside, that is, from the transmission apparatus 51, to the head-mounted type display unit, then the visibility of the image displayed can be enhanced. Or a light reception sensor may be further provided such that the luminance of an image to be displayed on the optical apparatus is controlled based on luminance information of the environment obtained by the light reception sensor, that is, of the atmosphere in which the head-mounted type display unit is placed or an observation object is placed. The light reception sensor may particularly be a photodiode or a light reception element for exposure measurement provided in the image pickup apparatus 17.

In this manner, in the head-mounted type display unit of the working example 1, if luminance information or luminance data and/or chromaticity information or chromaticity data are included, then it can be prevented with certainty that characters representative of a conversation or the like are less likely to be visually observed depending upon the background with respect to the characters. It is to be noted that the luminance information may be luminance information corresponding to the luminance of a predetermined region, for example, a region corresponding to one third of the entire stage from below, including an observation object such as a performer in a theatrical performance, the background or the like watched through the image display apparatus. Meanwhile, the chromaticity information may correspond to the chromaticity of a predetermined region including an observation object observed through the image display apparatus. Particularly, if the balance between the brightness of a screen, a stage or the like observed through optical apparatus of the semi-transmission type or see-through type and the brightness or the color of characters displayed on the optical apparatus is not within a certain range, then it is sometimes difficult to observe the subtitles, screen, stage or the like well. However, the brightness or color of characters to be displayed can be adjusted to the screen, stage or the like, and the characters can be visually observed well. In other words, it is possible to prevent it with certainty that it becomes difficult to visually observe characters for explanation or the like of an observation object or the like watched by an observer or spectator depending upon the background of the characters.

It is to be noted that, in the head-mounted type display unit of the working example 1 or in any of the working examples 2 to 7 to be described later:

a data group which is configured from a plurality of data is stored in the storage section provided in the control section;

each of the data which configure the data group has a data identification code applied thereto;

the control section receives a designation identification code and display time information sent at predetermined intervals of time from the outside and reads out data whose data identification code coincides with the received designation identification code from the storage section; and an image based on the data is displayed on the image forming apparatus for a period of time corresponding to the received display time information.

Working Example 2

Figure 14:
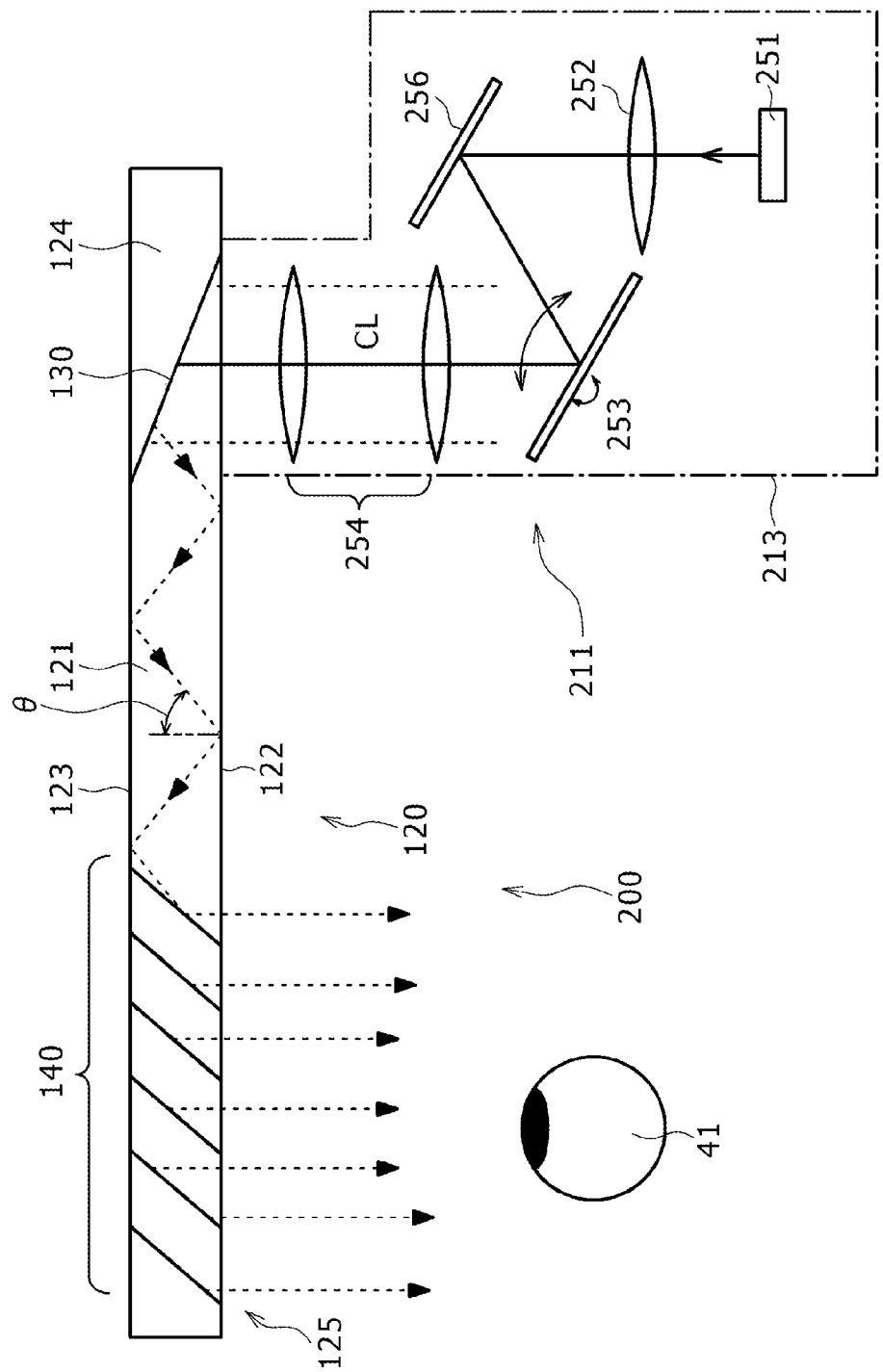
FIGS. 14, 15A and 15B, and 16 are schematic views showing image display apparatus of a head-mounted type display unit according to working examples 2, 3 and 4 of the present invention, respectively.
Figure 16:
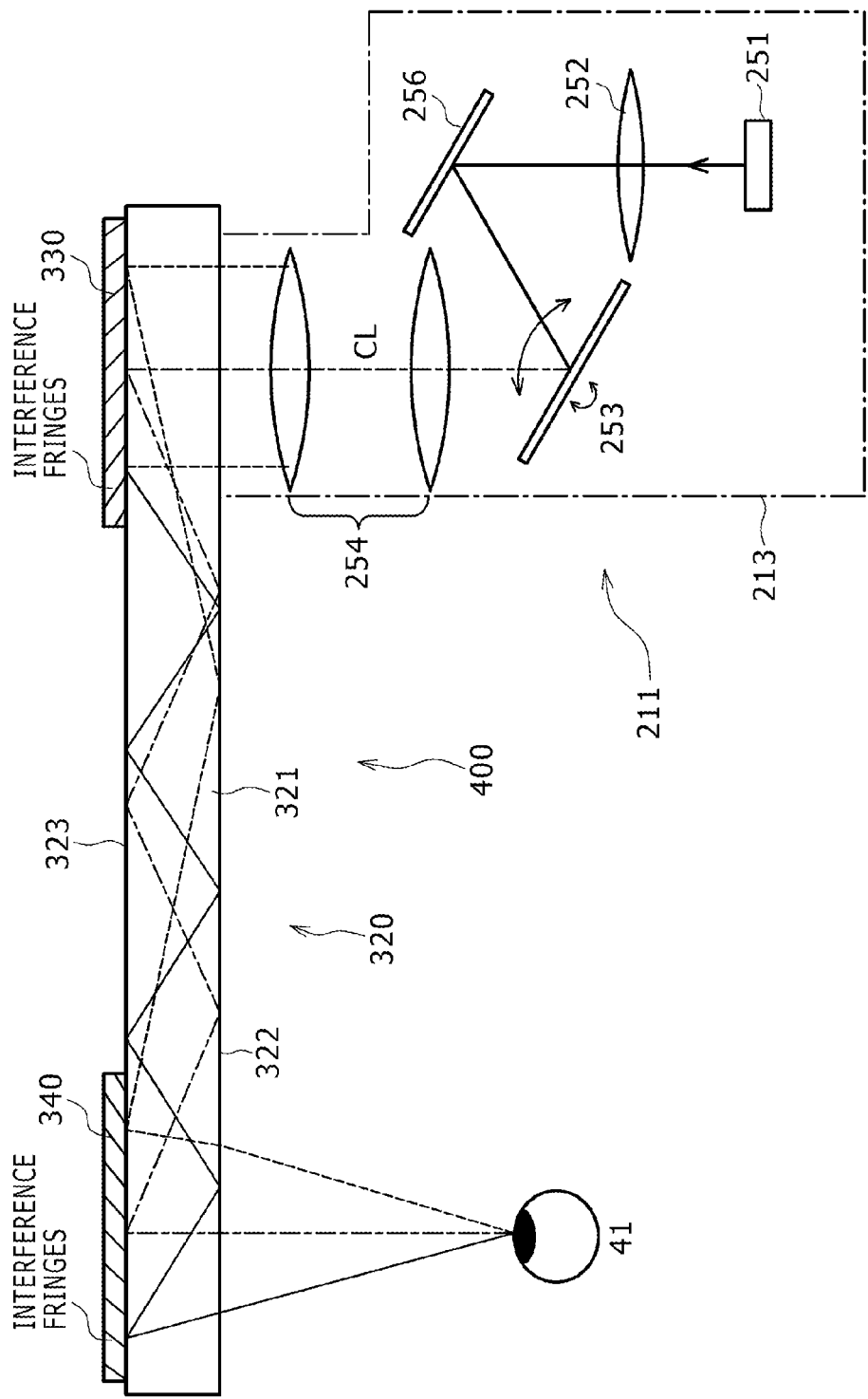

The working example 2 is a modification to the image display apparatus according to the working example 1. Referring to FIGS. 14 and 16 which schematically show the image display apparatus 200 or 400 of the head-mounted type display unit of the working example 2 and the working example 4 which is hereinafter described, the image forming apparatus 211 is configured from an image forming apparatus of a second configuration. In particular, the image forming apparatus 211 includes a light source 251, and a scanning section 253 for scanning parallel light emitted from the light source 251. More particularly, the image forming apparatus 211 includes:

a light source 251;

a collimate optical system 252 for converting light emitted from the light source 251 into parallel light;

a scanning section 253 configured to scan the parallel light outputted from the collimate optical system 252; and a relay optical system 254 for relaying and outputting the parallel light scanned by the scanning section 253.

It is to be noted that the entire image forming apparatus 211 is accommodated in a housing 213 indicated by an alternate long and short dash line in FIG. 14 or 16, and an opening not shown is provided in the housing 213 such that light is outputted from the relay optical system 254 through the opening. Each housing 213 is attached to a temple portions 13 by an attaching member 19.

The light source 251 is configured from a light emitting element which emits white light. The light emitted from the light source 251 is inputted to the collimate optical system 252 which generally has positive optical power and is outputted as parallel light from the collimate optical system 252. Then, this parallel light is reflected by a total reflection mirror 256, and horizontal scanning and vertical scanning are carried out by the scanning section 253 which is formed from an MEMS which includes a micromirror member supported for rotation in two-dimensional directions and can scan the inputted parallel light two-dimensionally. Consequently, the parallel light is converted into a kind of two-dimensional image thereby to produce virtual pixels, whose number may be equal to that in the working example 1. Then, the light from the virtual pixels passes the relay optical system or parallel light emitting optical system 254 formed from a known relay optical system, whereupon it is converted into parallel light. Then, the light flux of the parallel light is inputted to the optical apparatus 120.

The optical apparatus 120 to which the light flux converted into the parallel light by the relay optical system 254 is inputted and by and from which the light flux is guided and outputted has a configuration and a structure same as those of the optical apparatus described hereinabove in connection with the working example 1. Therefore, detailed overlapping description of the optical apparatus 120 is omitted herein to avoid redundancy. The head-mounted type display unit of the working example 2 has a configuration and a structure same as those of the head-mounted type display unit of the working example 1 except the differences described above, and therefore, overlapping detailed description of the same is omitted herein to avoid redundancy.

Working Example 3

Figures 15A, 15B:
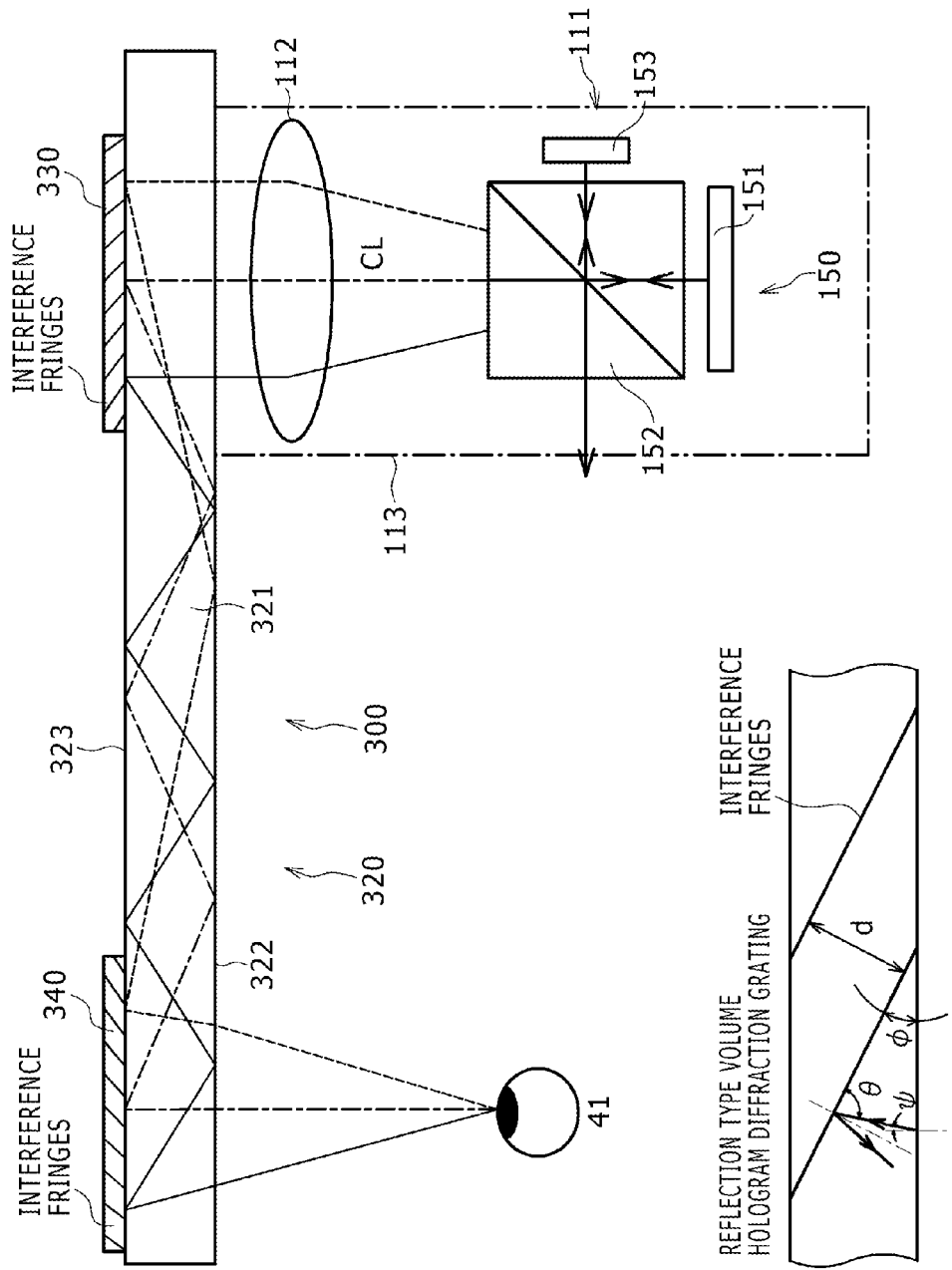

Also the working example 3 is a modification to the image display apparatus in the working example 1. The image display apparatus 300 in the head-mounted type display unit of the working example 3 is schematically shown in FIG. 15A. Meanwhile, a cross section of part of a reflection type volume hologram diffraction grating used in the image display apparatus 300 is schematically shown in FIG. 15B. In the working example 3, the image forming apparatus 111 is configured from an image forming apparatus of the first configuration similarly as in the working example 1. Meanwhile, the optical apparatus 320 is similar in basic configuration and structure to the optical apparatus 120 in the working example 1 except that the first and second deflection sections are different in configuration and structure.

Referring to FIGS. 15A and 15B, in the working example 3, the first and second deflection sections are disposed on the surface of the light guide plate 321, particularly on the second face 323 of the light guide plate 321. Then, the first deflection section diffracts light inputted to the light guide plate 321, and the second deflection section diffracts light propagated in the inside of the light guide plate 321 by total reflection over a plural number of times. Here, the first and second deflection sections are each configured from a diffraction grating element, particularly from a reflection type diffraction grating element, more particularly from a reflection type volume hologram diffraction grating. In the following description, the first deflection section formed from a reflection type volume hologram diffraction grating is hereinafter referred to as "first diffraction grating member 330" for the convenience of description, and the second deflection section formed from a reflection type volume hologram diffraction grating is hereinafter referred to as "second diffraction grating member 340" for the convenience of description.

Further, in the working example 3 and the working example 4 which is hereinafter described, the first diffraction grating member 330 and the second diffraction grating member 340 are configured such that one diffraction grating layer is laminated. It is to be noted that, in each diffraction grating layer made of a photopolymer material, interference fringes corresponding to one kind of wavelength band or wavelength are formed, and the diffraction grating layer is produced by an existing method. The pitch of the interference fringes formed on the diffraction grating layers or diffraction optical element is fixed, and the interference fringes extend linearly in parallel to the Z axis. It is to be noted that the axial lines of the first diffraction grating member 330 and the second diffraction grating member 340 extend in parallel to the X axis while normals to the first diffraction grating member 330 and the second diffraction grating member 340 extend in parallel to the Y axis.

An enlarged schematic partial sectional view of the reflection type volume hologram diffraction grating is shown in FIG. 15B. Interference fringes having an inclination $\phi$ are formed on the reflection type volume hologram diffraction grating. The inclination $\phi$ signifies an angle defined by the surface of the reflection type volume hologram diffraction grating and the interference fringes. The interference fringes are formed over the inside to the surface of the reflection type volume hologram diffraction grating. The interference fringes satisfy the Bragg condition. The Bragg condition signifies a condition which satisfies the expression (A) given below:

$$m \cdot \lambda = 2 \cdot d \cdot \sin(\Theta) \quad (A)$$

where m is a positive integer, λ the wavelength, d the pitch of grating faces, that is, the distance between virtual planes including the interference fringes in the normal direction, and Θ the complementary angle to the angle of incidence to the interference fringes. Meanwhile, the relationship of the complementary angle Θ, inclination φ and incidence angle ψ where light enters the diffraction grating member at the incidence angle ψ is given by the following expression (B):

$$\Theta = 90° - (\phi + \psi) \quad (B)$$

The first diffraction grating member 330 is disposed on and adhered to the second face 323 of the light guide plate 321 as described hereinabove, and diffracts and reflects parallel light inputted from the first face 322 to the light guide plate 321 such that the parallel light is totally reflected in the inside of the light guide plate 321. Further, the second diffraction grating member 340 is disposed on and adhered to the second face 323 of the light guide plate 321 as described hereinabove such that the parallel light propagating in the inside of the light guide plate 321 by total reflection is diffracted and reflected by a plural number of times. The parallel light is thereafter outputted from the first face 322 of the light guide plate 321 while it remains as parallel light.

Also the light guide plate 321 outputs the parallel light after the parallel light propagates by total reflection in the inside thereof. At this time, since the light guide plate 321 is thin and the light path along which the parallel light advances in the inside of the light guide plate 321 is long, the number of times of total reflection until the parallel light comes to the second diffraction grating member 340 differs depending upon the angle of view. More particularly, the number of times of reflection of parallel light which enters at an angle of a direction in which the parallel light approaches the second diffraction grating member 340 from within the parallel light inputted to the light guide plate 321 is smaller than that of parallel light which is inputted to the light guide plate 321 at an angle of another direction in which the parallel light is separated from the second diffraction grating member 340. This is because the parallel light which is diffracted and reflected by the first diffraction grating member 330 and is inputted to the light guide plate 321 at an angle of a direction in which the parallel light approaches the second diffraction grating member 340 forms a smaller angle with respect to a normal to the light guide plate 321 when light propagating in the inside of the light guide plate 321 comes to the inner face of the light guide plate 321 than the parallel light which is inputted at an angle of the reverse direction to the light guide plate 321. Further, the shape of the interference fringes formed in the inside of the second diffraction grating member 340 and the shape of the interference fringes formed in the inside of the first diffraction grating member 330 have a symmetrical relationship to each other with respect to a virtual plane perpendicular to the axial line of the light guide plate 321.

Also the light guide plate 321 in the working example 4 described below has a configuration and a structure basically same as those of the light guide plate 321 described hereinabove. The head-mounted type display unit of the working example 3 has a configuration and a structure same as those of the head-mounted type display unit of the working example 1 except the differences described above, and therefore, overlapping detailed description of the same is omitted herein to avoid redundancy.

Working Example 4

The working example 4 is a modification to the image display apparatus in the working example 3. The image display apparatus in the head-mounted type display unit of the working example 4 is shown in FIG. 16. The image display apparatus 400 in the working example 4 includes a light source 251, a collimate optical system 252, a scanning section 253 and parallel light outputting optical system or relay optical system 254, which have a similar configuration and structure same as those of the image forming apparatus of the second configuration in the working example 2. Meanwhile, the optical apparatus 320 in the working example 4 basically has a configuration and a structure same as the optical apparatus 320 in the working example 3. The head-mounted type display unit in the working example 4 basically has a configuration and a structure same as those of the head-mounted type display unit of the working examples 1 and 2 except the differences of the image display apparatus described above. Therefore, overlapping detailed description of the optical apparatus 320 is omitted herein to avoid redundancy.

Working Example 5

Figure 17A:
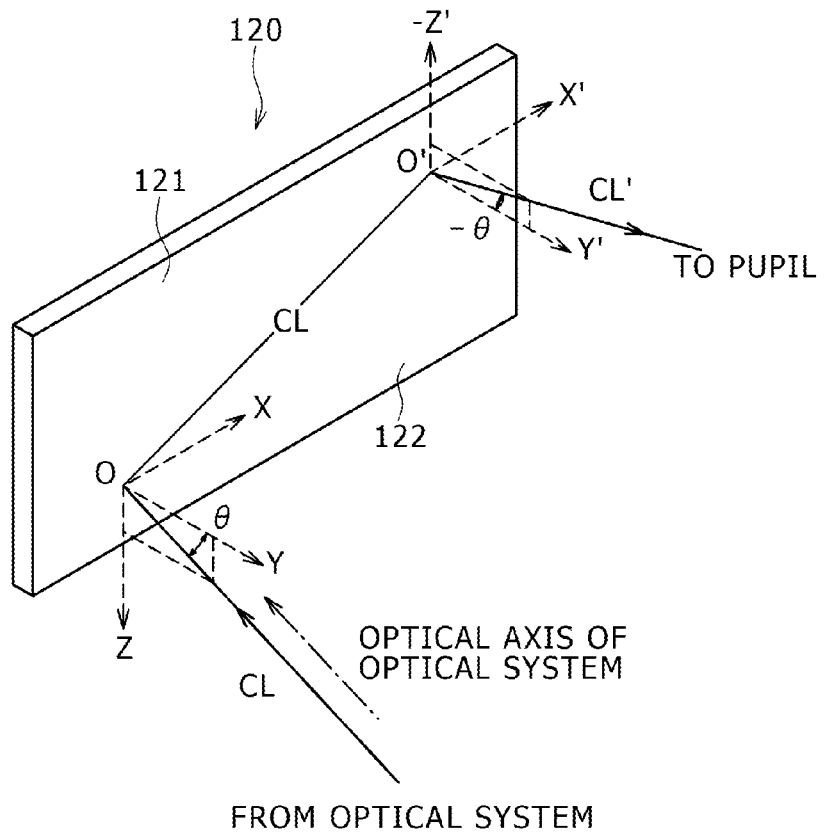
FIG. 17A is a schematic view illustrating propagation of light in and around a light guide plate which configures an image display apparatus of a head-mounted type display unit according to a working example 5 of the present invention and FIG. 17B is a schematic view illustrating a disposition state of the light guide plate and so forth of the image display apparatus.
Figure 17B:
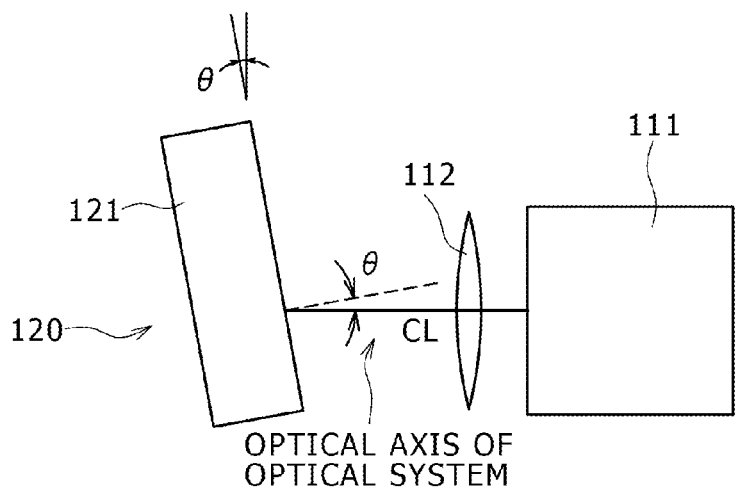
Figure 18:
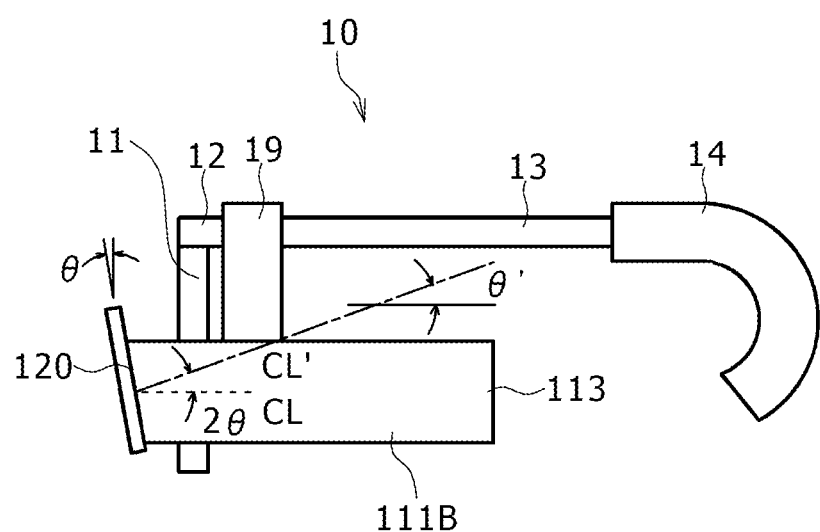
FIG. 18 is a schematic view of the head-mounted type display unit according to the working example 5 as viewed from a side.

The working example 5 is a modification to the image display apparatus in the working examples 1 to 4. A disposition state of a light guide plate and so forth which configure the image display apparatus in the head-mounted type display unit of the working example 5 is shown in FIGS. 17A and 17B, and a schematic view of the head-mounted type display unit of the working example 5 as viewed from a side is shown in FIG. 18.

In the working examples 1 to 4, as seen in FIG. 2, image display apparatus 100 or 300 is designed such that the center light ray CL outputted from the center of the image forming apparatus 111 or 211 and passing the image forming apparatus side nodal point of the optical system 112 or 254 comes perpendicularly to the light guide plate 121 or 321. In other words, the center light ray CL enters the light guide plate 121 or 321 at the incidence angle of 0 degree. In this instance, the center of the image displayed coincides with the perpendicular direction of the first face 122 or 322 of the light guide plate 121 or 321.

In other words, in such an image display apparatus as described above as represented by the image display apparatus 100, as seen in FIG. 2, the center light ray CL outputted from the center of the image forming apparatus 111 positioned on the optical axis of the collimate optical system 112 is converted into substantially parallel light by the collimate optical system 112 and then inputted perpendicularly to the first face or incidence face 122 of the light guide plate 121. Then, while the center light ray CL is totally reflected between the first face 122 and the second face 123 by the first deflection section 130, it advances along the propagation direction A. Thereafter, the center light ray CL is reflected and diffracted by the second deflection section 140 and outputted perpendicularly from the first face 122 of the light guide plate 121, and then comes to the pupil 41 of the observer 40 or spectator.

Figure 23:
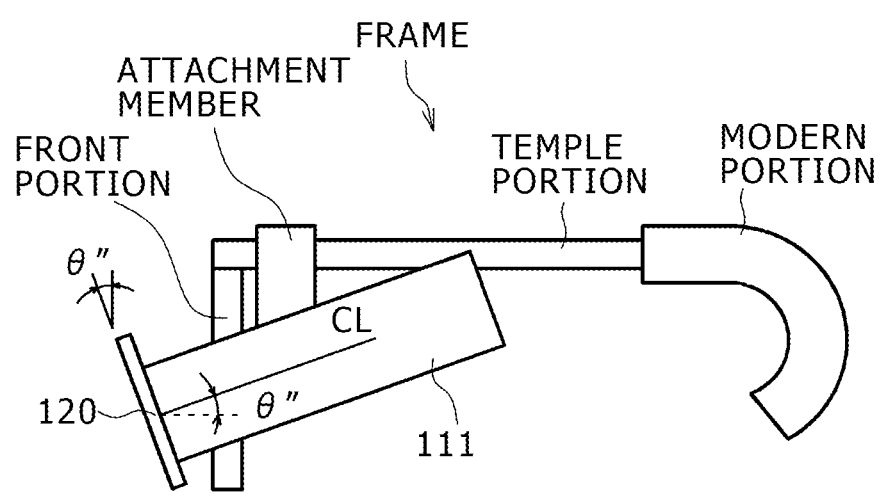
FIG. 23 is a schematic view of a form of the head-mounted type display unit according to the working example 1 as viewed from a side.

In the case where the head-mounted type display unit is of the see-through type, in order to prevent the optical apparatus 120, 320 or 520 from making an obstacle when the observer or spectator watches an observation object positioned in a horizontal direction, preferably the optical apparatus 120, 320 or 520 is disposed in a downwardly displaced relationship from a line of sight of the observer in the horizontal direction, that is, from a horizontal line of sight of the observer. In this case, the image display apparatus 100, 300 as a whole is disposed in a downwardly displaced relationship from a line of sight of the observer in the horizontal direction. Incidentally, in such a configuration as described above, it is necessary to tilt the entire image display apparatus 100 by an angle θ" as seen in FIG. 23, and the angle θ" by which the image display apparatus 100 can be tilted may be limited or the degree of freedom in design may be decreased from a relationship of the frame of the glasses type to the attaching portions, that is, the temple portions, for mounting on the head of the observer. Therefore, it is further preferable to make it possible to dispose the image display apparatus 100 with a high degree of freedom in design so that it may not make an obstacle to the horizontal line of sight of the spectator and besides have a high degree of freedom in design.

In the working example 5, the center light ray CL crosses with the XY plane at an angle θ other than 0 degree. Further, the center light ray CL is included in the YZ plane. Further, in the working example 5 or in the working example 6 hereinafter described, the optical axis of the optical system 112 or 254 is included in the YZ plane and crosses with the XY plane at an angle other than 0 degree, particularly at the angle θ (refer to FIGS. 17A and 17B). Further, in the working example 5 or in the working example 6 hereinafter described, when it is assumed that the XY plane coincides with a horizontal plane, the angle θ at which the center light ray CL crosses with the XY plane is an angle of elevation. In other words, the center light ray CL is directed from the lower side of the XY plane toward the XY plane and collides with the XY plane. Then, the XY plane crosses with the vertical plane at an angle other than 0 degree, particularly at the angle θ.

Figure 19A:
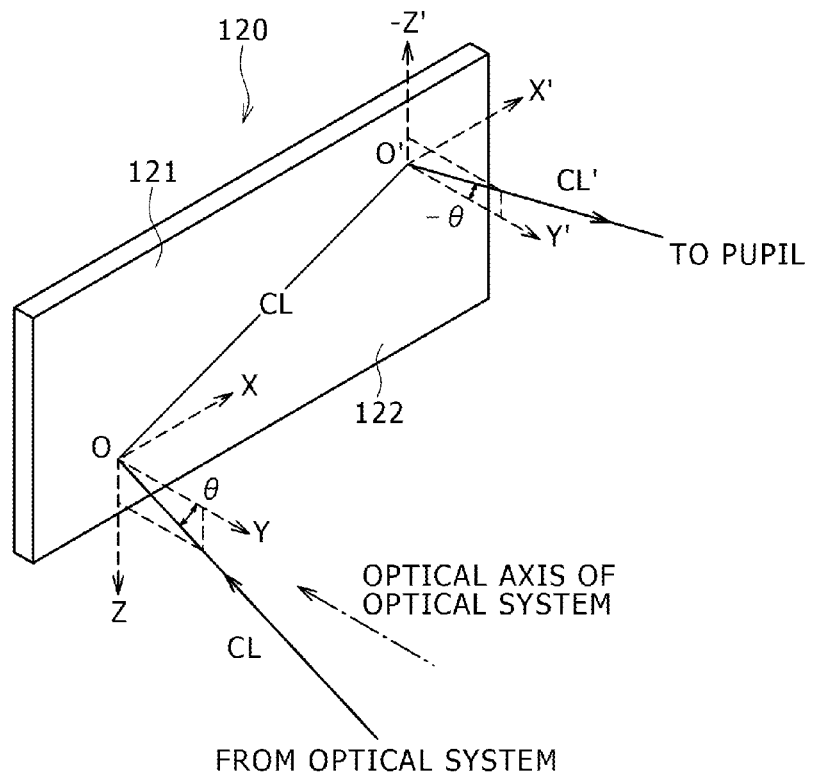
FIG. 19A is a schematic view illustrating propagation of light in and around a light guide plate which configures an image display apparatus of a head-mounted type display unit according to a working example 6 of the present invention and FIG. 19B is a schematic view illustrating a disposition state of the light guide plate and so forth of the image display apparatus.

In the working example 5, the angle θ is set to θ=5 degrees. More particularly, in such a configuration as described above, the center light ray CL indicated by a broken line in FIG. 18 is included in the horizontal plane. Further, the optical apparatus 120, 320 or 520 is inclined by an angle of θ degrees with respect to the vertical plane. In other words, the optical apparatus 120, 320 or 520 is inclined by an angle of 90-θ degrees with respect to the horizontal plane. Further, the center light ray CL' indicated by an alternate long and short dash line in FIG. 18 outputted from the optical apparatus 120, 320 or 520 is inclined by an angle 2θ with respect to the horizontal plane. In particular, when the observer watches an object article at a point at infinity in the horizontal direction, the center light ray CL' emitted from the optical apparatus 120, 320 or 520 and inputted to the pupil of the observer forms an angle θ' of elevation (=2θ) (refer to FIG. 18). The angle defined by the center light ray CL' with respect to the normal to the optical apparatus 120, 320 or 520 is θ. In FIG. 17A or FIG. 19A described hereinafter, the point at which the center light ray CL' is outputted from the optical apparatus 120, 320 or 520 is represented by "O'," and axial lines passing the point O' and parallel to the X, Y and Z axes are represented as X', Y' and Z' axes, respectively.

In the image display apparatus in the working example 5, the center light ray CL crosses with the XY plane at an angle other than 0 degree, that is, at the angle θ. While the center light ray CL' emitted from the optical apparatus and inputted to the pupil of the observer or spectator forms an angle θ', the angle θ and the angle θ' have the following relationship:

θ'=2θ.

Meanwhile, in the example shown in FIG. 23, if it is tried to obtain the same angle of elevation, it is necessary to tilt the entire image display apparatus by the angle θ", and the angles θ" and θ have the following relationship:

θ"=2θ.

After all, in the example shown in FIG. 23, the optical apparatus has to be tilted by 2θ with respect to the vertical plane. On the other hand, in the working example 5, only it is necessary to tilt the optical apparatus by θ with respect to the vertical plane and keep the image forming apparatus horizontally. Accordingly, the restriction to the attaching angle of the image display apparatus when the image display apparatus is attached to the attaching portion of the frame of the glasses type is little, and a high degree of freedom in design can be achieved. Further, since the inclination of the optical device with respect to the vertical plane is smaller than that in the example shown in FIG. 23, such a phenomenon that external light is reflected by the optical device and advances into the pupil of the observer or spectator is less likely to occur. Therefore, an image of higher quality can be displayed.

The head-mounted type display unit of the working example 5 has a configuration and a structure same as those of the head-mounted type display unit of the working examples 1 to 4 except the differences described above. Therefore, overlapping detailed description of the head-mounted type display unit of the working example 5 is omitted herein to avoid redundancy.

Working Example 6

Figure 19B:
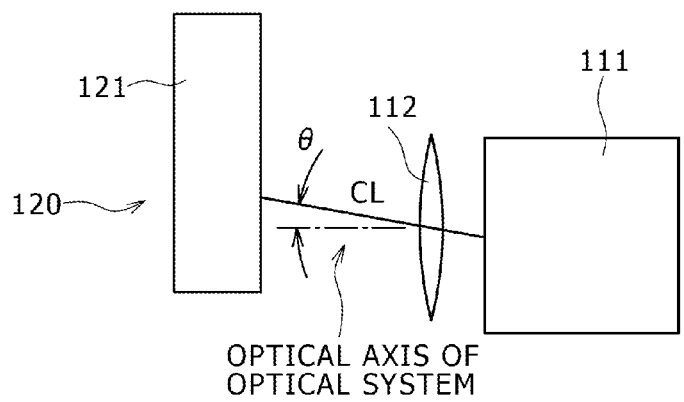

The working example 6 is a modification to the image display apparatus in the working example 5. A disposition state of a light guide plate and so forth which configure the image display apparatus in the head-mounted type display unit of the working example 5 is shown in FIGS. 19A and 19B. Referring to FIGS. 19A and 19B, in the working example 6, the optical axis of the optical system 112, that is, of the parallel light outputting optical system or collimate optical system, extends in parallel to the YZ plane and in parallel to the XY plane, and besides passes a position displaced from the center of the image forming apparatus 111. By the configuration just described, the center light ray CL is included in the YZ plane and crosses with the XY plane so as to form an angle θ of elevation. The head-mounted type display unit of the working example 6 has a configuration and a structure same as those of the head-mounted type display unit of the working examples 1 to 5 except the differences described above. Therefore, overlapping detailed description of the head-mounted type display unit of the working example 6 is omitted herein to avoid redundancy.

Working Example 7

Figure 20:
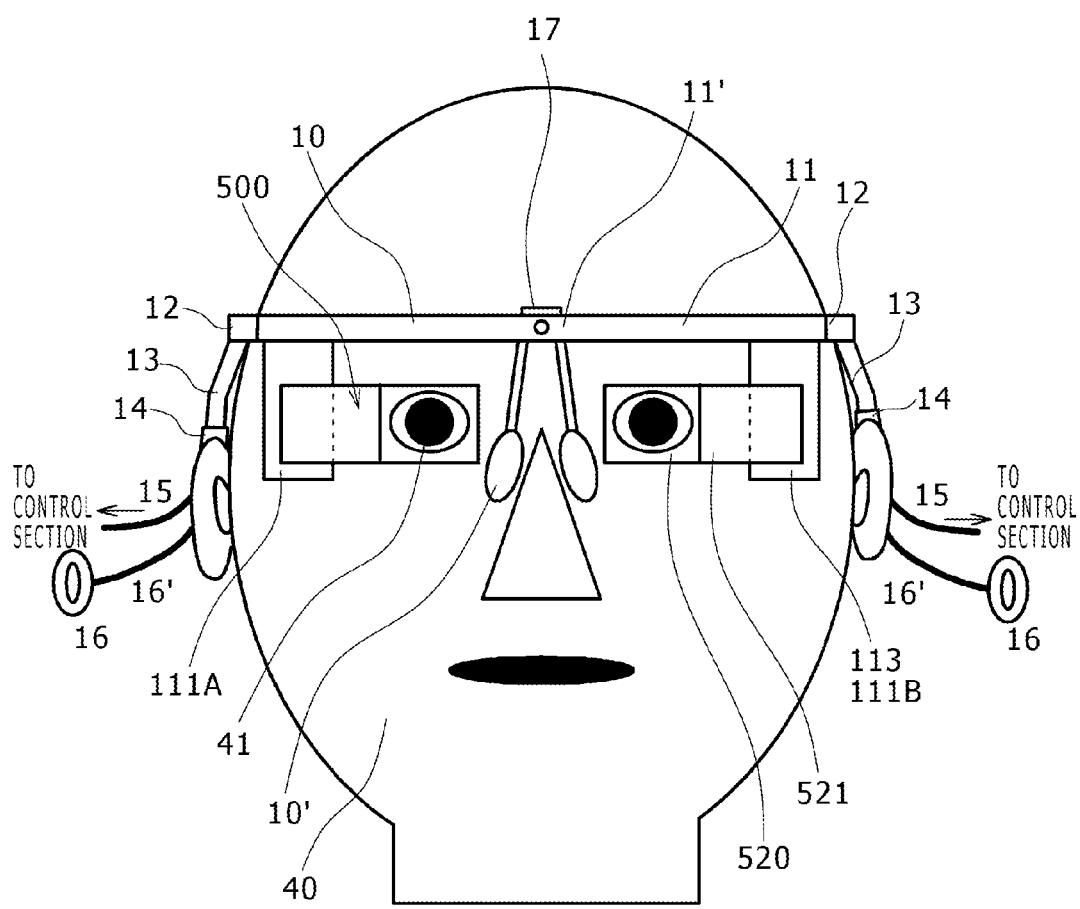
FIG. 20 is a view showing a head-mounted type display unit according to a working example 7 of the present invention as viewed from the front.
Figure 21:
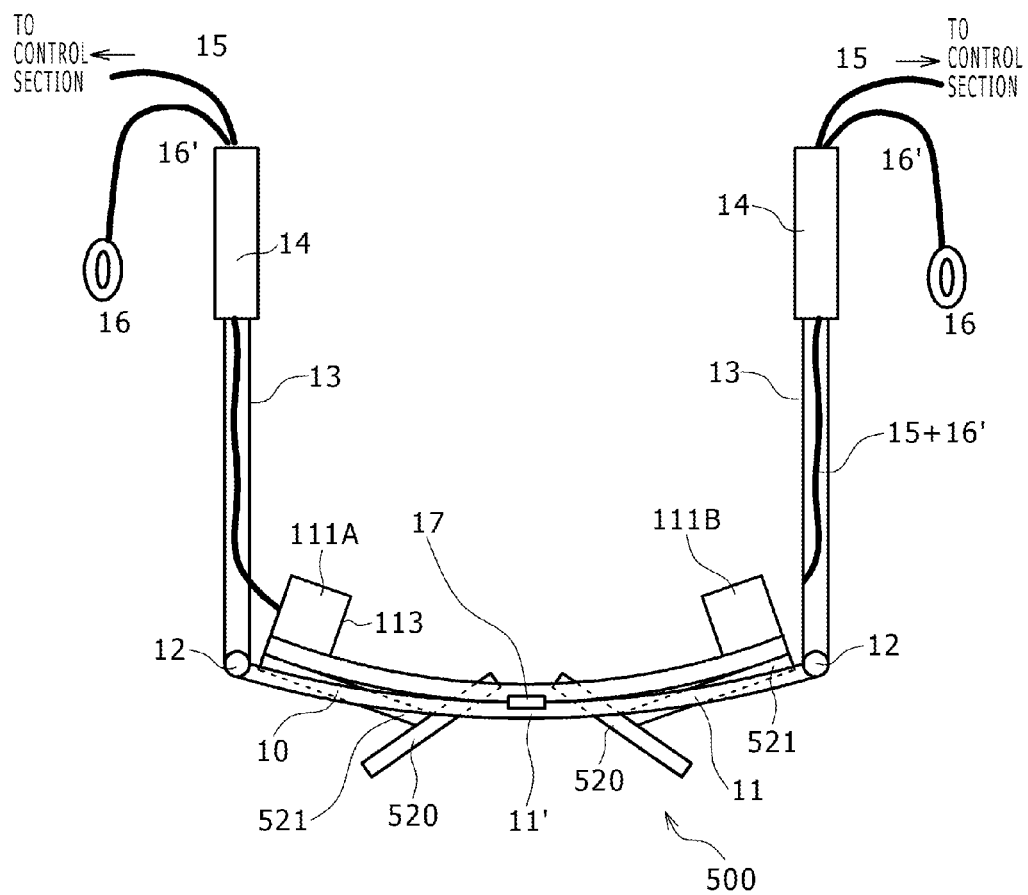
FIG. 21 is a schematic view showing the head-mounted type display unit of FIG. 20 as viewed from above.

Also the working example 7 is a modification to the image display apparatus in the working example 1. A schematic view of the head-mounted type display unit of the working example 7 as viewed from the front is shown in FIG. 20, and a schematic view as viewed from above is shown in FIG. 21.

In the working example 7, an optical apparatus 520 is configured from a semi-transmission mirror to which light outputted from the image forming apparatus 111A or 111B is inputted and from which the light is outputted toward the pupil 41 of the observer 40. It is to be noted that, in the working example 7, light outputted from the image forming apparatus 111A or 111B propagates in the inside of a transparent member 521 which may be a glass plate or a plastic plate until it enters the optical apparatus 520 in the form of a semi-transmission mirror. However, the optical apparatus 520 may otherwise be structured such that the light emitted from the image forming apparatus 111A or 111B propagates in the air until it is inputted to the optical apparatus 520.

Further, the image forming apparatus may be the image forming apparatus 211 described hereinabove in connection with the working example 2.

Each of the image forming apparatus 111A and 111B is attached to the front portion 11 using, for example, a screw. Further, the member 521 is attached to each of the image forming apparatus 111A and 111B, and the optical apparatus 520 in the form of a semi-transmission mirror is attached to the member 521. The head-mounted type display unit of the working example 7 has a configuration and a structure substantially same as those of the head-mounted type display unit of the working examples 1 to 6 except the differences described above. Therefore, overlapping detailed description of the head-mounted type display unit of the working example 7 is omitted herein to avoid redundancy.

Working Example 8

The working example 8 relates to an image displaying method according to the second embodiment of the present invention and further relates to an image displaying method according to the 1-Ath embodiment of the present invention which is a modification to the image displaying method of the working example 1. In the working example 8, the head-mounted type display units and the image display apparatus described hereinabove in the description of the working examples 1 to 7 can be applied. However, in the working example 8, in order to set a distance between an observation object and the head-mounted type display unit, a changeover button (refer to FIG. 10(B)) or switch is provided on the control section 18. Then, in response to a seat on which an observer or spectator is to be seated, the distance from the head-mounted type display unit to the observation object is set manually, that is, by an operation of the changeover button or switch. As an example, setting of four different distances such as "short distance," "medium distance," "long distance" and "very long distance" can be made for the distance from the head-mounted type display unit to the observation object.

In the image displaying method of the working example 8, a data group configured from a plurality of data is stored in the storage section provided in the control section 18 and a data identification code is applied to each of the data which configure the data group similarly as in the working example 1.

It is to be noted, however, that, different from the working example 1, each data is configured from a plurality of different size display data for different display sizes. In particular, in the working example 8, display data for different display sizes are image data of images of character strings of different font sizes. It is to be noted that the data structure of one different size display data may be similar to that illustrated in FIG. 9. Each data has a data identification code applied thereto similarly as in the working example 1.

Also in the working example 8, a designation identification code is sent from the outside, that is, from the transmission apparatus 51, to the control section 18 similarly as in the working example 1. Then, the control section 18 reads out, from among data whose data identification code coincides with the received designation identification code, one of plural different size display data in response to the distance between the observation object and the head-mounted type display unit, particularly in response to the distance from the head-mounted type display unit to the observation object set by an operation of the changeover button or switch provided on the control section 18 from the storage section. Then, images based on the one different size display data are displayed on the image forming apparatus.

It is to be noted that, also in the working example 8, a designation identification code and display time information $T_{Inf}$ are sent from the outside, that is, from the transmission apparatus 51, to the control section 18 at the predetermined time intervals $T_{int}$ similarly as in the working example 1. Then, an image is displayed on the image forming apparatus for a period of time corresponding to the received display time information $T_{Inf}$. Also the image displaying device according to the 1-Ath embodiment of the present invention can be applied.

It is to be noted that the distance information from the head-mounted type display unit to the observation object may be signaled by wireless transmission from the outside to the head-mounted type display unit. Or, the head-mounted type display unit may further include a distance measuring apparatus for measuring the distance from the head-mounted type display unit to the observation object such that distance information is obtained using the distance measuring apparatus. As the distance measuring apparatus, for example, the image pickup apparatus 17 may be configured as an image pickup apparatus with an automatic focusing function, that is, an image pickup apparatus having a distance measuring apparatus of the passive type.

In this manner, in the image displaying method of the working example 8, the control apparatus reads out, from among those data whose data identification code coincides with a received designation identification code, one of a plurality of different size display data in response to the distance between the observation object and the head-mounted type display unit from the storage section. Then, an image based on the one different size display data is displayed on the image forming apparatus. Consequently, imbalance between the visually observed size of the observation object and the size of the image is less likely to occur.

It is to be noted that, in the head-mounted type display unit of the working example 8:

a data group configured from a plurality of data is stored in the storage section provided in the control section;

a data identification code is applied to each of the data which configure the data group;

each of the data is configured from a plurality of different size display data for different display sizes;

the control section receives a designation identification code sent thereto from the outside and reads out, from among those data whose data identification code coincides with the designation identification code received from the outside, one of the plural different size display data in response to the distance between the observation object and the head-mounted type display unit from the storage section; and an image based on the one different size display data is displayed on the image forming apparatus.

Then, in the head-mounted type display unit of the working example 8 which has such a configuration as described above and is suitable for execution of the image displaying method according to the 1-Ath embodiment of the present invention, the head-mounted type display unit described hereinabove in the description of the working example 1 is configured such that;

each of the data is configured from a plurality of different size display data for different display sizes;

the control section reads out, from among those data whose data identification code coincides with the received designation identification code, one of the plural different size display data in response to the distance between the observation object and the head-mounted type display unit from the storage section; and an image based on this different size display data is displayed on the image forming apparatus.

Working Example 9

The working example 9 relates to the image displaying method according to the third embodiment of the present invention and further relates to the image displaying method according to the 1-Bth embodiment which is a modification to the image displaying method of the working example 1, the image displaying method according to the 1-A'th embodiment of the present invention and the image displaying method according to the 2-Ath embodiment of the present invention which is a modification to the image displaying method of the working example 8. Also in the working example 9, the head-mounted type display units and the image display apparatus described hereinabove in connection with the working examples 1 to 7 can be applied.

Also in the image displaying method of the working example 9, a data group configured from a plurality of data is stored in the storage section provided in the control section 18 and a data identification code is applied to each of the data which configure the data group similarly as in the working example 1.

However, different from the working example 1, each of the data in the working example 9 is configured from a plurality of different language display data of different display languages. For example, the languages may be Chinese, Korean, English and so forth. More particularly, in the working example 9, the display data of the different display languages may be image data of character strings of the different languages. It is to be noted that one language display data may have a data structure similar to that described hereinabove with reference to FIG. 9, and each data has a data identification code applied thereto similarly as in the working example 1.

Also in the working example 9, a designation identification code is sent from the outside, that is, from the transmission apparatus 51, to the control section 18. Then, the control section 18 reads out one of the plural different language display data from within the data whose data identification code coincides with the received designation identification code from the storage section. Then, the control section 18 controls the image forming apparatus to display an image based on the one different language display data. A changeover button (refer to FIG. 10B) or switch may be provided in the control section 18 to manually select a desired display language.

In this manner, in the image displaying method of the working example 9, the control section 18 reads out one of the plural different language display data from within the data whose data identification code coincides with the received designation identification code from the storage section. Then, the control section 18 controls the image forming apparatus to display an image based on this different language display data. Therefore, with the image displaying method of the working example 9, image display based on a language used by an observer or spectator can be carried out readily.

It is to be noted that, also in the working example 9, the image displaying method described hereinabove in connection with the working example 1 can be applied. In other words, the image displaying method according to the 1-Bth embodiment of the present invention can be applied. In particular, the control section 18 reads out one of the plural different language display data from within the data whose data identification code coincides with the received designation identification code from the storage section. Then, the control section 18 controls the image forming apparatus to display an image based on this different language display data. In particular, a designation identification code and display time information $T_{Inf}$ are sent from the outside, that is, from the transmission apparatus 51, to the control section 18 at the predetermined time intervals $T_{int}$, and then, an image is displayed on the image forming apparatus for a period of time corresponding to the received display time information $T_{Inf}$.

Also it is possible to combine the image displaying method of the working example 9 and the image displaying method of the working example 8. In other words, describing in conformity with the image displaying method according to the 1-A'th embodiment which is a modification to the image displaying method of the working example 1 or the image displaying method according to the 2-Ath embodiment of the present invention which is a modification to the image displaying method of the working example 8, each different size display data may be configured from a plurality of different language display data of different display languages. And, the control section 18 may select one of a plurality of different size display data in response to the distance between the observation object and the head-mounted type display unit from among the data whose data identification code coincides with received designation identification code, read out one of a plurality of different language display data from within this one different size display data from the storage section, and control the image forming apparatus to display an image based on this one different language display data. In this instance, a designation identification code and display time information $T_{Inf}$ are sent from the outside, that is, from the transmission apparatus 51, to the control section 18 at predetermined time intervals $T_{int}$, and an image is displayed on the image forming apparatus for a period of time corresponding to the received display time information $T_{Inf}$.

It is to be noted that, in the head-mounted type display unit of the working example 9:

a data group which is configured from a plurality of data is stored in the storage section provided in the control section;

each of the data which configure the data group has a data identification code applied thereto;

each of the data is configured from a plurality of different language display data for different display languages;

the control section receives a designation identification code sent thereto from the outside and reads out one of a plurality of different language display data from within the data whose data identification code coincides with the received designation identification code from the storage section; and an image based on this one different language display data is displayed on the image forming apparatus.

Then, in the head-mounted type display unit of the working example 9 which has such a configuration as described above and is suitable for execution of the image displaying method according to the 1-Bth embodiment of the present invention, the head-mounted type display unit described hereinabove in the description of the working example 1 is configured such that;

each of the data is configured from a plurality of different language display data for different display languages;

the control section reads out, from among those data whose data identification code coincides with the received designation identification code, one of the plural different language display data from the storage section; and an image based on this one different language display data is displayed on the image forming apparatus.

Further, in the head-mounted type display unit of the working example 9 which has such a configuration as described above and is suitable for execution of the image displaying method according to the 1-A'th embodiment of the present invention, the head-mounted type display unit described hereinabove in the description of the working example 1 is configured such that;

each of the different size display data is configured from a plurality of different language display data of different display languages;

the control section selects one of the plural different size display data of the data whose data identification code coincides with the received designation identification code in response to the distance between the observation object and the head-mounted type display unit and reads out one of the plural different language display data from within this one different size display data; and an image based on this one different language display data is displayed on the image forming apparatus.

Further, in the head-mounted type display unit of the working example 9 which has such a configuration as described above and is suitable for execution of the image displaying method according to the 2-Ath embodiment of the present invention;

each of the different size display data is configured from a plurality of different language display data of different display languages;

the control section selects one of the plural different size display data of the data whose data identification code coincides with the received designation identification code in response to the distance between the observation object and the head-mounted type display unit and reads out one of the plural different language display data from within the one different size display data; and an image based on this one different language display data is displayed on the image forming apparatus.

Working Example 10

The working example 10 relates to the image displaying method according to the fourth embodiment of the present invention and further relates to the image displaying method according to the 1-Cth embodiment which is a modification to the image displaying method of the working example 1, the image displaying method according to the 4-Ath embodiment of the present invention, the image displaying method according to the 4-A'th embodiment of the present invention and the image display apparatus according to the 4-Bth embodiment of the present invention. Also in the working example 10, the head-mounted type display units and the image display apparatus described hereinabove in connection with the working examples 1 to 7 can be applied.

Also in the image displaying method of the working example 10, a data group which is configured from a plurality of data is stored in the storage section provided in the control section 18 and each of the data which configure the data group has a data identification code applied thereto similarly as in the working example 1. It is to be noted that each data has a data structure similar to that described hereinabove in the working example 1 and has a data identification code added thereto similarly as in the working example 1.

Also in the working example 10, a designation identification code is sent from the outside, that is, from the transmission apparatus 51, to the control section 18. Then, the control section 18 reads out data whose data identification code coincides with the received designation identification code from the storage section and carries out data processing of the read out data in response to the distance between the observation object and the head-mounted type display unit. Then, the control section 18 controls the image forming apparatus to display images based on the processed data in a state in which the convergence angle is controlled. It is to be noted that, although image processing for data to the image forming apparatus which configures at least one of the image display apparatus may be carried out based on the distance from the head-mounted type display unit to the observation object, in the working example 10, image processing of data for the image forming apparatus which configure both of the image display apparatus is carried out.

Setting of the distance between the observation object and the head-mounted type display unit and so forth may be carried out similarly to that described hereinabove in connection with the working example 8.

Figure 22:
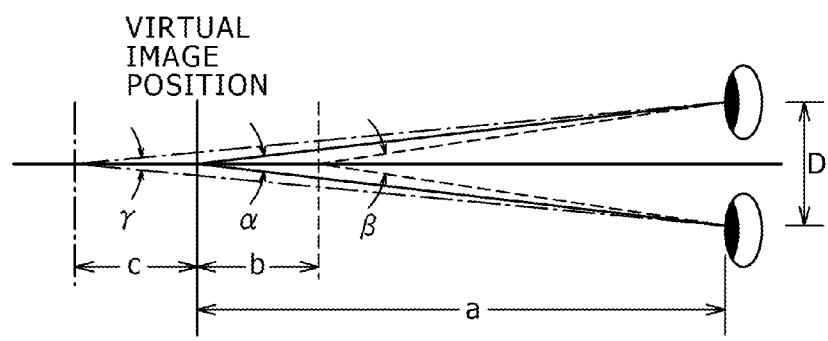
FIG. 22 is a schematic view illustrating adjustment of the angle of convergence corresponding to the distance from a head-mounted type display unit to an observation object.

Data processing in response to the distance between the observation object and the head-mounted type display unit, that is, adjustment of the angle of conversion corresponding to the distance from the head-mounted type display unit to the observation object, is described with reference to FIG. 22. Here, the virtual image distance of an image (characters) based on data to be displayed by the image display apparatus is represented by "a" and the angle of convergence between the images at this time is represented by "α." Further, the angle of convergence between the images at a point spaced by "c" from the virtual image distance a is represented by "γ" and the convergence angle between the images at a point displaced by "b" from the virtual image distance a is represented by "β." Further, the distance between the left and right pupils is represented by "D." Here, if it is assumed that D=61.5 mm
a=4,000 mm then α=53 minutes (53').

It is defined that one pixel of the image forming apparatus presents 3 minutes (3'). Here, if it is assumed that the image display position is displaced inwardly by one pixel distance in a horizontal direction from a predetermined position, then the convergence angle β becomes β=56 minutes (56')

and the distance b becomes b=225 mm.

On the other hand, if it is assumed that the image display position is displaced outwardly by one pixel distance in a horizontal direction from a predetermined position, then the convergence angle γ becomes γ=50 minutes (50')

and the distance c becomes b=228 mm.

Further, if the virtual image distance a is set to a=8,000 mm then if the image is shifted by one pixel distance, then the virtual image distance can be changed by approximately 1 m, that is, the virtual image distance can be shifted by 1 m.

By displacing the image display position by a distance of a desired number of pixels in a horizontal direction from a predetermined position in this manner, adjustment of the angle of conversion can be carried out. In other words, by controlling data to the image forming apparatus 111A or 111B which configure the two image display apparatus 100, 200, 300, 400 or 500 for the right and left eyes using a convergence angle controlling signal, which is a signal for displaying the image displaying position to the outer side or the inner side by a distance corresponding to a suitable number of pixels in a horizontal direction, accurate adjustment of the angle of conversion corresponding to the distance from the head-mounted type display unit to the observation object can be carried out. As a result, the distance between the observation object and the observer or spectator 40 and the virtual image distance of an image such as an image of characters to be displayed by the image display apparatus can be made equal to each other or can be made equal to each other as far as possible. Consequently, the observer or spectator 40 who watches the observation object can watch images displayed by the image display apparatus naturally without changing the focus thereof very much.

In the case where a head-mounted type display unit is used, for example, in a theater, a caption for explaining contents, a progressing situation, the background and so forth of a theatrical performance may be displayed as an image on the head-mounted type display unit. However, it is demanded to make the virtual image distance equal to a desired distance. In particular, the distance between the observation object and the observer or spectator and the virtual image distance of an image such as an image of characters displayed by the image display apparatus vary depending upon the position at which the observer is seated. Accordingly, it is necessary to optimize the virtual image distance in response to the position of the observer. Thus, with the head-mounted type display unit of the working example 10, optimization of the angle of convergence corresponding to the distance from the head-mounted type display unit to the observation object can be achieved, and consequently, the virtual image distance can be optimized in response to the position of the observer. Further, although it is sometimes desired to vary the virtual image distance depending upon the scene, in such an instance, such variation of the virtual image distance can be carried out readily by signaling the distance information from the head-mounted type display unit to the observation object, for example, from the outside to the head-mounted type display unit.

Or, it is possible for the observer or spectator to set the virtual image distance to a desired distance or set the virtual image position to a desired position. In particular, it is possible to dispose a changeover switch or button on the control section 18 such that a virtual image is disposed at a desired distance or position by an operation of the changeover switch or button by the observer. For example, when the background changes, it is possible to change the virtual image distance or virtual image position arbitrarily. Such an operation may be carried out suitably by the observer, for example, upon observation of the observation object and particularly is an operation of the control section 18 to add a convergence angle controlling signal to data. This makes it possible for the spectator to read, for example, characters of the subtitles or the like with certainty without moving the line of sight thereof very much and makes is possible to display the subtitles and so forth suitable for individual spectators readily and simultaneously.

Further, it is said that, if the virtual image position is fixed, then the eyes are tired. This is because, if the focus is fixed, then the movement of the eyeballs decreases. Therefore, by changing the virtual image distance suitably or moving the virtual image position suitably, there is an effect that the tiredness of the eyes can be reduced. In other words, the positions of virtual images formed by the two optical apparatus or the distances of the virtual images formed by the two optical apparatus from the two optical apparatus, that is, the virtual image distances, may be changed with respect to time.

It is to be noted that, also in the working example 10, the image displaying method described hereinabove in connection with the working example 1 can be applied. In other words, the image displaying method according to the 1-Cth embodiment of the present invention can be applied. In particular, in the working example 10, similarly as in the working example 1, the control section 18 reads out the data whose data identification code coincides with the received designation identification code from the storage section and controls the image forming apparatus to display an image based on the data. In particular, a designation identification code and display time information $T_{Inf}$ are sent from the outside, that is, from the transmission apparatus 51, to the control section 18 at the predetermined time intervals $T_{int}$, and then, an image is displayed on the image forming apparatus for a period of time corresponding to the received display time information $T_{Inf}$.

Also it is possible to combine the image displaying method of the working example 10 and the image displaying method of the working example 8. In other words, describing in conformity with the image displaying method according to the 4-Ath embodiment of the present invention, the image displaying method may be configured such that each data is configured from a plurality of different size display data of different display sizes, and the control section 18 reads out one of the plural different size display data of the data whose data identification code coincides with the received designation identification code in response to the distance between the observation object and the head-mounted type display unit from the storage section and carries out data processing of the read out different size display data in response to the distance between the observation object and the head-mounted type display unit such that images based on this one different size display data are displayed on the image forming apparatus in a state in which the angle of convergence is controlled.

Or, also it is possible to combine the image displaying method of the working example 10 and the image displaying methods of the working examples 8 and 9. In other words, describing in conformity with the image displaying method according to the 4-A'th embodiment of the present invention, the image displaying method may be configured such that each different size display data is configured from a plurality of different language display data of different display languages, and the control section 18 selects one of the plural different size display data of the data whose data identification code coincides with the received designation identification code in response to the distance between the observation object and the head-mounted type display unit, reads out one of the plural different language display data in the one different size display data from the storage section and carries out data processing of the read out different language display data in response to the distance between the observation object and the head-mounted type display unit such that images based on the one different language display data are displayed on the image forming apparatus in a state in which the angle of convergence is controlled.

Or, also it is possible to combine the image displaying method of the working example 10 and the image displaying method of the working example 9. In other words, describing in conformity with the image displaying method according to the 4-Bth embodiment of the present invention, the image displaying method may be configured such that each data is configured from a plurality of different language display data of different display languages, and the control section 18 reads out one of the plural different language display data of the data whose data identification code coincides with the received designation identification code in response to the distance between the observation object and the head-mounted type display unit and carries out data processing of the read out different language display data in response to the distance between the observation object and the head-mounted type display unit such that images based on this one different language display data are displayed on the image forming apparatus in a state in which the angle of convergence is controlled.

It is to be noted that the head-mounted type display unit of the working example 10 may be configured such that:

a data group which is configured from a plurality of data is stored in the storage section provided in the control section;

each of the data which configure the data group has a data identification code applied thereto;

the control section receives a designation identification code sent thereto from the outside, reads out data whose data identification code coincides with the received designation identification code from the storage section and carries out data processing of the read out data in response to the distance between the observation object and the head-mounted type display unit; and images based on this one different language display data are displayed on the image forming apparatus in a state in which the angle of convergence is controlled.

Then, in the head-mounted type display unit of the working example 10 which has such a configuration as described above and is suitable for execution of the image displaying method according to the 1-Cth embodiment of the present invention, the head-mounted type display unit described hereinabove in the description of the working example 1 is configured such that;

the control section carries out data processing in response to the distance between the observation object and the head-mounted type display unit such that images are displayed on the image forming apparatus in a state in which the angle of convergence is controlled.

Further, in the head-mounted type display unit of the working example 10 which has such a configuration as described above and is suitable for execution of the image displaying method according to the 4-Ath embodiment of the present invention;

each data is configured from a plurality of different size display data of different display sizes;

the control section reads out one of the plural different size display data of the data whose data identification code coincides with the received designation identification code in response to the distance between the observation object and the head-mounted type display unit and carries out data processing in response to the distance between the observation object and the head-mounted type display unit; and images based on this one different size display data are displayed on the image forming apparatus in a state in which the angle of convergence is controlled.

Further, the head-mounted type display unit of the working example 10 which has such a configuration as described above and is suitable for execution of the image displaying method according to the 4-A'th embodiment of the present invention is configured such that;

each of the different size display data is configured from a plurality of different language display data of different display languages;

the control section selects one of the plural different size display data of the data whose data identification code coincides with the received designation identification code in response to the distance between the observation object and the head-mounted type display unit, reads out one of the plural different language display data from within this one different size display data and carries out data processing in response to the distance between the observation object and the head-mounted type display unit; and images based on this one different language display data are displayed on the image forming apparatus in a state in which the angle of convergence is controlled.

Further, the head-mounted type display unit of the working example 10 which has such a configuration as described above and is suitable for execution of the image displaying method according to the 4-Bth embodiment of the present invention is configured such that;

each data is configured from a plurality of different language display data of different display languages;

the control section reads out one of the plural different language display data of the data whose data identification code coincides with the received designation identification code in response to the distance between the observation object and the head-mounted type display unit from the storage section and carries out data processing in response to the distance between the observation object and the head-mounted type display unit; and images based on this one different language display data are displayed on the image forming apparatus in a state in which the angle of convergence is controlled.

While preferred working examples of the present invention are described above, the present invention is not limited to the working examples. The configurations and structures of the head-mounted type display units and the image display apparatus described hereinabove in connection with the working examples are illustrative and can be altered suitably. For example, a surface relief type hologram (refer to U.S. Patent No. 20040062505A1) may be disposed in the light guide plate. In the optical apparatus 320 of the working example 3 or the working example 4, the diffraction grating element may be formed from a transmission type diffraction grating element, or one of the first deflection section and the second deflection section may be configured from a reflection type diffraction grating element while the other one of the first deflection section and the second deflection section is configured from a transmission type diffraction grating element. Or else, the diffraction grating element may be a reflection type brazed diffraction grating element.

The present application contains subject matter related to that disclosed in Japanese Priority Patent Application JP 2010-089495 filed in the Japan Patent Office on Apr. 8, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A head-mounted type display unit comprising:
   (a) a frame,
   (b) an image display apparatus attached to the frame, the image display apparatus including: (A) an image forming apparatus, and (B) an optical apparatus configured to guide light outputted from the image forming apparatus, and
   (c) a control section configured to control the image display,
   wherein:
      the control section is configured to receive display time information from outside the head-mounted type display unit;
      the control section is configured to control the image forming apparatus to display an image for a period of time corresponding to the display time information;

the control section comprises a storage section configured to store two or more data units, a first of the one or more data units comprising a first data identification code and first display data, a second of the one or more data units comprising a second data identification code and second display data; and the first display data comprises text data or image data.

2. The head-mounted type display unit of claim 1, wherein the image display apparatus is a first image display apparatus, wherein the image is a first image, wherein the head-mounted type display unit further comprises a second image display apparatus, wherein the control section is further configured to control the second image display apparatus to display a second image, and wherein the control section is further configured to control an angle of convergence between the first and second images.

3. The head-mounted type display unit of claim 1, wherein the control section is further configured to receive a designation identification code from outside the head-mounted display unit, and to select, from the one or more data units, a data unit comprising a data identification code coinciding with the received designation identification code, and wherein the image displayed by the image forming apparatus corresponds to display data of the selected data unit.

4. The head-mounted type display unit of claim 3, wherein the control section is further configured to control a size of the image based, at least in part, on a distance between the head-mounted type display unit and an observation object.

5. The head-mounted type display unit of claim 4, further comprising a distance measuring apparatus configured to determine the distance between the head-mounted type display unit and the observation object.

6. The head-mounted type display unit of claim 3, wherein the control section is further configured to control a language of characters included in the image based, at least in part, on language data received from outside the head-mounted type display unit.

7. The head-mounted type display unit of claim 3, further comprising a language selection unit, wherein the control section is further configured to control a language of characters included in the image based, at least in part, on an operation of the language selection unit.

8. A head-mounted type display unit comprising:
(a) a frame,
(b) an image display apparatus attached to the frame, the image display apparatus including: (A) an image forming apparatus, and (B) an optical apparatus configured to guide light outputted from the image forming apparatus,
(c) a control section configured to control the image display,
wherein the control section is configured to control a size of an image displayed by the image forming apparatus according to a distance between an observation object and the head-mounted type display unit;
wherein the control section comprises a storage section configured to store two or more data units, a first of the one or more data units comprising a first data identification code and first display data, a second of the one or more data units comprising a second data identification code and second display data; and
wherein the first display data comprises text data or image data.

9. The head-mounted type display unit of claim 8, wherein the image display apparatus is a first image display apparatus, wherein the image is a first image, wherein the head-mounted type display unit further comprises a second image display apparatus, wherein the control section is further configured to control the second image display apparatus to display a second image, and wherein the control section is further configured to control an angle of convergence between the first and second images.

10. The head-mounted type display unit of claim 8, wherein the control section is further configured to receive a designation identification code from outside the head-mounted display unit, and to select, from the one or more data units, a data unit comprising a data identification code coinciding with the received designation identification code, and wherein the image displayed by the image forming apparatus corresponds to display data of the selected data unit.

11. The head-mounted type display unit of claim 10, further comprising a distance measuring apparatus configured to determine the distance between the head-mounted type display unit and the observation object.

12. The head-mounted type display unit of claim 10, wherein the control section is further configured to control a language of characters included in the image based, at least in part, on language data received from outside the head-mounted type display unit.

13. The head-mounted type display unit of claim 10, further comprising a language selection unit, wherein the control section is further configured to control a language of characters included in the image based, at least in part, on an operation of the language selection unit.

14. A head-mounted type display unit comprising:
(a) a frame,
(b) an image display apparatus attached to the frame, the image display apparatus including: (A) an image forming apparatus, and (B) an optical apparatus configured to guide light outputted from the image forming apparatus, and
(c) a control section configured to control the image display,
wherein:
the control section is configured to receive display time information from outside the head-mounted type display unit; and
the control section is configured to control the image forming apparatus to display an image for a period of time corresponding to the display time information,
wherein the image display apparatus is a first image display apparatus, wherein the image is a first image, wherein the head-mounted type display unit further comprises a second image display apparatus, wherein the control section is further configured to control the second image display apparatus to display a second image, and wherein the control section is further configured to control an angle of convergence between the first and second images.

15. The head-mounted type display unit of claim 14, wherein the optical apparatus is semi-transmissive.

16. The head-mounted type display unit of claim 14, further comprising an image pickup apparatus configured to transmit a signal to the image display apparatus.

17. A head-mounted type display unit comprising:
(a) a frame,
(b) an image display apparatus attached to the frame, the image display apparatus including: (A) an image forming apparatus, and (B) an optical apparatus configured to guide light outputted from the image forming apparatus,
(c) a control section configured to control the image display,
wherein the control section is configured to control a size of an image displayed by the image forming apparatus according to a distance between an observation object and the head-mounted type display unit, and wherein the image display apparatus is a first image display apparatus, wherein the image is a first image, wherein the head-mounted type display unit further comprises a second image display apparatus, wherein the control section is further configured to control the second image display apparatus to display a second image, and wherein the control section is further configured to control an angle of convergence between the first and second images.

18. The head-mounted type display unit of claim 17, wherein the optical apparatus is semi-transmissive.

19. The head-mounted type display unit of claim 17, further comprising an image pickup apparatus configured to transmit a signal to the image display apparatus.

20. The head-mounted type display unit of claim 17, wherein the optical apparatus comprises a mirror to direct the light outputted from the image forming apparatus to a pupil of an observer.

* * * * *